United States Patent
Kobayashi et al.

(10) Patent No.: US 11,557,087 B2
(45) Date of Patent: Jan. 17, 2023

(54) IMAGE PROCESSING APPARATUS AND IMAGE PROCESSING METHOD FOR GENERATING A STROBE IMAGE USING A THREE-DIMENSIONAL MODEL OF AN OBJECT

(71) Applicant: SONY GROUP CORPORATION, Tokyo (JP)

(72) Inventors: Goh Kobayashi, Tokyo (JP); Hiroshi Oryoji, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,645

(22) PCT Filed: Dec. 5, 2019

(86) PCT No.: PCT/JP2019/047540
§ 371 (c)(1),
(2) Date: Jun. 11, 2021

(87) PCT Pub. No.: WO2020/129659
PCT Pub. Date: Jun. 25, 2020

(65) Prior Publication Data
US 2022/0036644 A1    Feb. 3, 2022

(30) Foreign Application Priority Data
Dec. 19, 2018 (JP) .............................. JP2018-237566

(51) Int. Cl.
*G06T 15/00* (2011.01)
*G06T 17/00* (2006.01)

(52) U.S. Cl.
CPC .......... *G06T 17/00* (2013.01); *G06T 2200/24* (2013.01)

(58) Field of Classification Search
None
See application file for complete search history.

(56) References Cited

U.S. PATENT DOCUMENTS 6,115,052 A * 9/2000 Freeman .................. G06T 13/40
382/209
2003/0085992 A1    5/2003 Arpa et al.
(Continued)

FOREIGN PATENT DOCUMENTS

CA    2466085 A1    8/2003
EP    1449180 A2    8/2004
(Continued)

OTHER PUBLICATIONS

International Search Report and Written Opinion of PCT Application No. PCT/JP2019/047540, dated Jan. 21, 2020, 08 pages of ISRWO.

*Primary Examiner* — Anh-Tuan V Nguyen
(74) *Attorney, Agent, or Firm* — Chip Law Group

(57) ABSTRACT

Provided are an image processing apparatus and an image processing method that enable a strobe image using a 3D model to be generated. A strobe model in which 3D models of an object at a plurality of times generated from a plurality of viewpoint images captured from a plurality of viewpoints are disposed in a three-dimensional space is generated. When the strobe model is generated, a target object that is a target in which the 3D model is disposed in the strobe model is set according to a degree of object relevance indicating relevance with a key object serving as a reference for disposition of the 3D model in the strobe model.

7 Claims, 36 Drawing Sheets

(56) References Cited

U.S. PATENT DOCUMENTS

| | | | |
|---|---|---|---|
| 2004/0017504 A1* | 1/2004 | Prandoni | H04N 7/188 348/370 |
| 2009/0237508 A1 | 9/2009 | Arpa et al. | |
| 2012/0002112 A1* | 1/2012 | Huang | H04N 5/144 348/E9.055 |
| 2012/0242779 A1* | 9/2012 | Liu | H04N 5/145 348/565 |
| 2013/0163961 A1* | 6/2013 | Wu | H04N 21/8146 386/E5.028 |
| 2017/0028643 A1* | 2/2017 | Grossman | G05B 19/4099 |
| 2018/0126272 A1* | 5/2018 | Hiruta | G06F 3/011 |
| 2018/0225852 A1* | 8/2018 | Um | G06T 7/292 |
| 2018/0302610 A1 | 10/2018 | Masuda et al. | |
| 2019/0089923 A1* | 3/2019 | Katano | G06K 9/6247 |
| 2019/0089942 A1* | 3/2019 | Hanamoto | G06T 17/05 |
| 2021/0044793 A1* | 2/2021 | Yoshikawa | H04N 21/2668 |

FOREIGN PATENT DOCUMENTS

| | | |
|---|---|---|
| EP | 3388119 A2 | 10/2018 |
| JP | 2005-517253 A | 6/2005 |
| JP | 2007-259477 A | 10/2007 |
| JP | 2016-219968 A | 12/2016 |
| JP | 2018-182566 A | 11/2018 |
| KR | 10-0940142 B1 | 2/2010 |
| WO | 2003/067537 A2 | 8/2003 |
| WO | 2017/082076 A1 | 5/2017 |

* cited by examiner

FIG. 12

| EFFECT MODE | CONTENT OF EFFECT PROCESSING | EFFECT DIRECTION | EFFECT DISTANCE |
|---|---|---|---|
| 0 | NO EFFECT PROCESSING | | |
| 1 | (GRADUALLY) MAKE 3D MODEL TRANSPARENT | past/future (default:past) | number/distance/time (default:number=1) |
| 2 | CAUSE 3D MODEL TO DISAPPEAR GRADUALLY | past/future (default:past) | number/distance/time |
| 3 | (GRADUALLY) REDUCE NUMBER OF TEXTURES OF 3D MODEL (VIEW DEPENDENT) | past/future (default:past) | number/distance/time |
| 4 | ERASE 3D MODEL | past/future (default:past) | number/distance/time (default:distance=5) |
| 5 | (GRADUALLY) REDUCE AT LEAST ONE OF BRIGHTNESS AND SATURATION OF 3D MODEL | past/future (default:past) | number/distance/time (default:time=10) |
| 6 | LIMIT NUMBER OF 3D MODELS DISPOSED ON STROBE IMAGE | past/future (default:past) | number/distance/time |
| 7 | (GRADUALLY) REDUCE NUMBER OF MESHES (NUMBER OF POLYGONS) OF 3D MODEL | past/future (default:past) | number/distance/time (default:number=3) |
| 8 | CHANGE REPRESENTATION FORMAT OF 3D MODEL INTO WIREFRAME | past/future (default:past) | number/distance/time |
| 9 | CHANGE REPRESENTATION FORMAT OF 3D MODEL FROM View Dependent INTO View Independent (Point Cloud) | past/future (default:past) | number/distance/time |
| 10 | ERASE 3D MODEL AND LEAVE EVIDENCE INDICATING THAT THERE IS 3D MODEL | past/future (default:past) | number/distance/time |
| 11 | CHANGE TEXTURE MATERIAL OF 3D MODEL | past/future | number/distance/time |
| 12 | BLUR SHAPE OF 3D MODEL | past/future | number/distance/time |
| 13 | CHANGE COLOR OF 3D MODEL | past/future | number/distance/time |
| 14 | CHANGE SIZE OF 3D MODEL | past/future | number/distance/time |

TIME

FIG. 24

| TIME | PHOTOGRAPHING ATTITUDE | PHOTOGRAPHING ATTITUDE | CAMERA PARAMETER |
|---|---|---|---|
| 0 | | | |
| 1 | | | |
| 2 | | | |
| ... | | | |

IMAGE PROCESSING APPARATUS AND IMAGE PROCESSING METHOD FOR GENERATING A STROBE IMAGE USING A THREE-DIMENSIONAL MODEL OF AN OBJECT

CROSS REFERENCE TO RELATED APPLICATIONS

This application is a U.S. National Phase of International Patent Application No. PCT/JP2019/047540 filed on Dec. 5, 2019, which claims priority benefit of Japanese Patent Application No. JP 2018-237566 filed in the Japan Patent Office on Dec. 19, 2018. Each of the above-referenced applications is hereby incorporated herein by reference in its entirety.

TECHNICAL FIELD

The present technology relates to an image processing apparatus, an image processing method, and a program and to, for example, generation of a strobe image using a 3D model.

BACKGROUND ART

A method of generating a strobe image in which a subject (image) photographed at a plurality of times is reflected has been proposed (see, for example, PTL 1). Since a subject at a plurality of times is reflected in the strobe image, it is possible to easily ascertain a movement or trajectory of the subject.

CITATION LIST

Patent Literature

[PTL 1]
JP 2007-259477A

SUMMARY

Technical Problem

However, PTL 1 is a technology for generating a strobe image from a two-dimensional moving image, and there is a limitation on an ability to generate and edit a strobe image.

The present technology has been made in view of such a situation and makes it possible to generate a strobe image.

Solution to Problem

An image processing apparatus and program of the present technology is an image processing apparatus including a generation unit configured to generate 3D models of an object generated from a plurality of viewpoint images captured from a plurality of viewpoints, from viewpoint images at a plurality of times, and to generate a strobe model in which 3D models of the object at a plurality of times are disposed in a three-dimensional space, wherein the generation unit disposes 3D models of an object different from a key object in the strobe model according to a degree of object relevance indicating a relevance between the key object and the different object, the key object serving as a reference for a disposition of the 3D models in the three-dimensional space, and a program for causing a computer to function as such an image processing apparatus.

An image processing method of the present technology is an image processing method including: generating 3D models of an object generated from a plurality of viewpoint images captured from a plurality of viewpoints, from viewpoint images at a plurality of times, to generate a strobe model in which the 3D models of the object at the plurality of times are disposed in a three-dimensional space, wherein 3D models of an object different from a key object are disposed in the strobe model according to a degree of object relevance indicating a relevance between the key object and the different object, the key object serving as a reference for a disposition of the 3D models in the three-dimensional space.

In the image processing apparatus, image processing method, and program of the present technology, the 3D models of the object generated from the plurality of viewpoint images captured from the plurality of viewpoints are generated from the viewpoint images at the plurality of times and the strobe model in which 3D models of the object at the plurality of times are disposed in the three-dimensional space is generated. The 3D models of the object different from the key object are disposed in the strobe model according to the degree of object relevance indicating the relevance between the key object and the different object, the key object serving as the reference for the disposition of the 3D models in the three-dimensional space.

The image processing apparatus or the display apparatus may be independent apparatuses or may be internal blocks constituting one apparatus.

Further, the program can be provided by being transmitted via a transmission medium or by being recorded on a recording medium.

BRIEF DESCRIPTION OF DRAWINGS

FIG. 12 is a diagram illustrating a specific example of effect processing.

FIG. 24 is a diagram illustrating a first example of camera work that is set by a camera work setting unit 35.

DESCRIPTION OF EMBODIMENTS

<Embodiment of Image Processing System to which the Present Technology is Applied>

Figure 1:
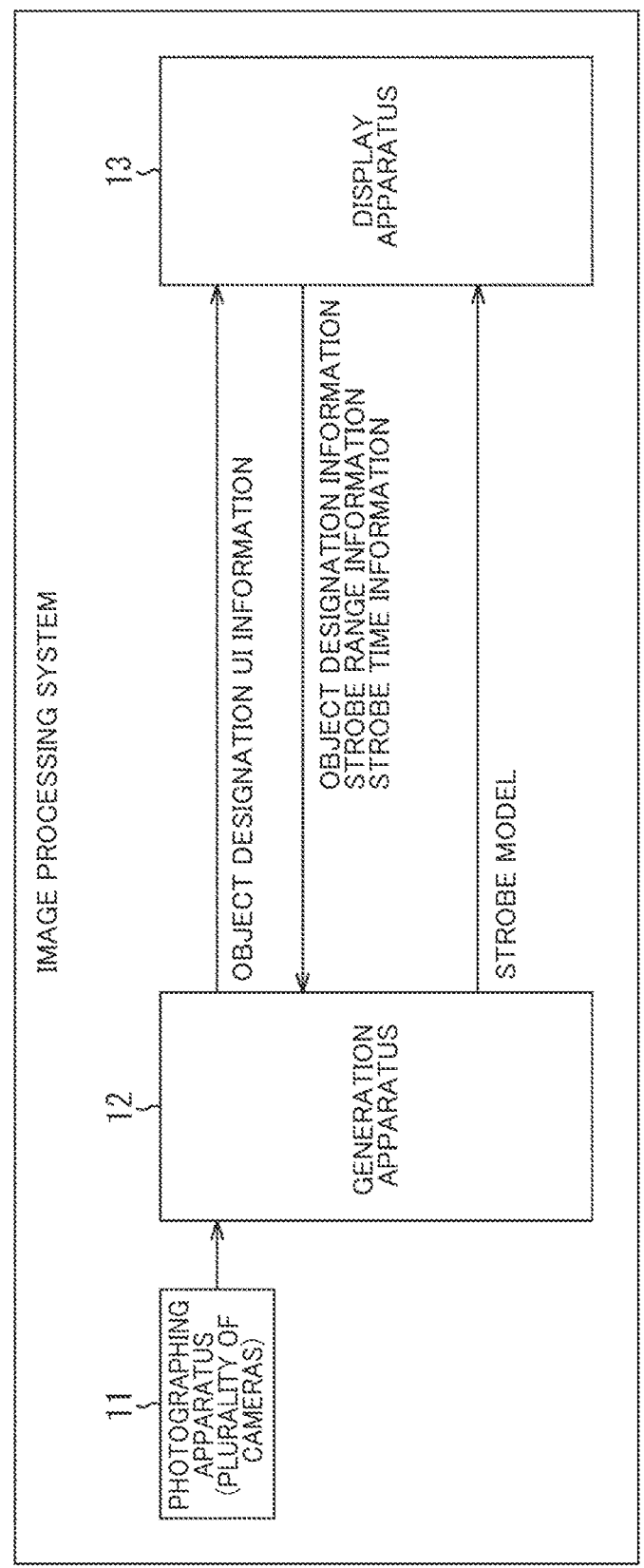
FIG. 1 is a block diagram illustrating a configuration example of an embodiment of an image processing system to which the present technology is applied.

FIG. 1 is a block diagram illustrating a configuration example of an embodiment of an image processing system to which the present technology is applied.

In the image processing system in FIG. 1, a 3D model serving as free viewpoint data from which a free viewpoint image in which an appearance when an object that is a subject in a three-dimensional space is viewed from a virtual viewpoint (virtual viewpoint) is reproduced can be generated from a live-action image is generated. A free viewpoint image when the object is viewed from the virtual viewpoint is generated from the 3D model and displayed.

The image processing system in FIG. 1 includes a photographing apparatus 11, a generation apparatus 12, and a display apparatus 13.

The photographing apparatus 11 includes at least a plurality of cameras, and performs photographing of an object from a plurality of viewpoints. For example, the plurality of cameras constituting the photographing apparatus 11 are disposed to surround the object, and each of the cameras photographs the object from a viewpoint as a position at which the camera is disposed. A 2D (Dimensional) image captured by each camera from a position of the camera, that is, viewpoint images (moving images) at a plurality of viewpoints which are 2D images captured from the plurality of viewpoints are supplied from the photographing apparatus 11 to the generation apparatus 12 in units of frames.

Here, the photographing apparatus 11 can be provided with a plurality of distance measurement apparatuses in addition to the plurality of cameras. The distance measurement apparatus can be disposed at the same position (viewpoint) as the camera, or can be disposed at a different position from the camera. The distance measurement apparatus measures a distance from a position (viewpoint) at which the distance measurement apparatus is disposed to the object, and generates a depth image that is a 2D image of which a pixel value is a depth that is information on the distance. The depth image is supplied from the photographing apparatus 11 to the generation apparatus 12.

When the photographing apparatus 11 is not provided with the distance measurement apparatus, a distance to the object can be measured according to a principle of triangulation using the viewpoint images at two viewpoints among the viewpoint images at the plurality of viewpoints, and the depth images can be generated.

The generation apparatus 12 is, for example, a server on a cloud. The generation apparatus 12 generates the object designation UI information and transmits the object designation UI information to the display apparatus 13. The object designation UI information is information on a UI serving as a marker for a user of the display apparatus 13 to designate an object (subject) of which a strobe model is generated. The strobe model is 3D data in which 3D models of the same object (subject) of a plurality of frames (times) of the viewpoint image are disposed in (3D model of) the three-dimensional space photographed by the photographing apparatus 11.

The generation apparatus 12 generates the strobe model using the viewpoint images at the plurality of viewpoints supplied from the photographing apparatus 11 according to the object designation information, the strobe range information, and the strobe time information transmitted from the display apparatus 13. Further, the generation apparatus 12 transmits the strobe model to the display apparatus 13.

The object designation information is information indicating an object designated by the user as an object (subject) serving as a reference (hereinafter also referred to as a key object) for disposition of a 3D model in the strobe model. The strobe range information is information indicating a spatial range of an object serving as an object that is a target (hereinafter also referred to as a target object) for the disposition of the 3D model in the strobe model together with the key object. The strobe time information is information indicating a section of a frame that is a target for which a strobe model is generated (hereinafter also referred to as a strobe section).

The display apparatus 13 is, for example, a client such as a PC (personal computer), a TV (television receiver), or a mobile terminal such as a smartphone. The display apparatus 13 displays an object designation UI according to the object designation UI information transmitted from the generation apparatus 12. The display apparatus 13 sets the object designation information, the strobe range information, and the strobe time information according to an operation of the user with respect to the object designation UI or the like, and transmits the information to the generation apparatus 12.

Further, the display apparatus 13 generates and displays a 2D image (here, including a set of a 2D image for a left eye and a 2D image for a right eye) serving as a 3D strobe image obtained by photographing the strobe model transmitted from the generation apparatus 12 with a virtual camera as a free viewpoint image (data).

The generation apparatus 12 and the display apparatus 13 can be configured as separate apparatuses, or can be configured as one apparatus (for example, a PC (Personal Computer)).

<Configuration Example of Generation Apparatus 12>

Figure 2:
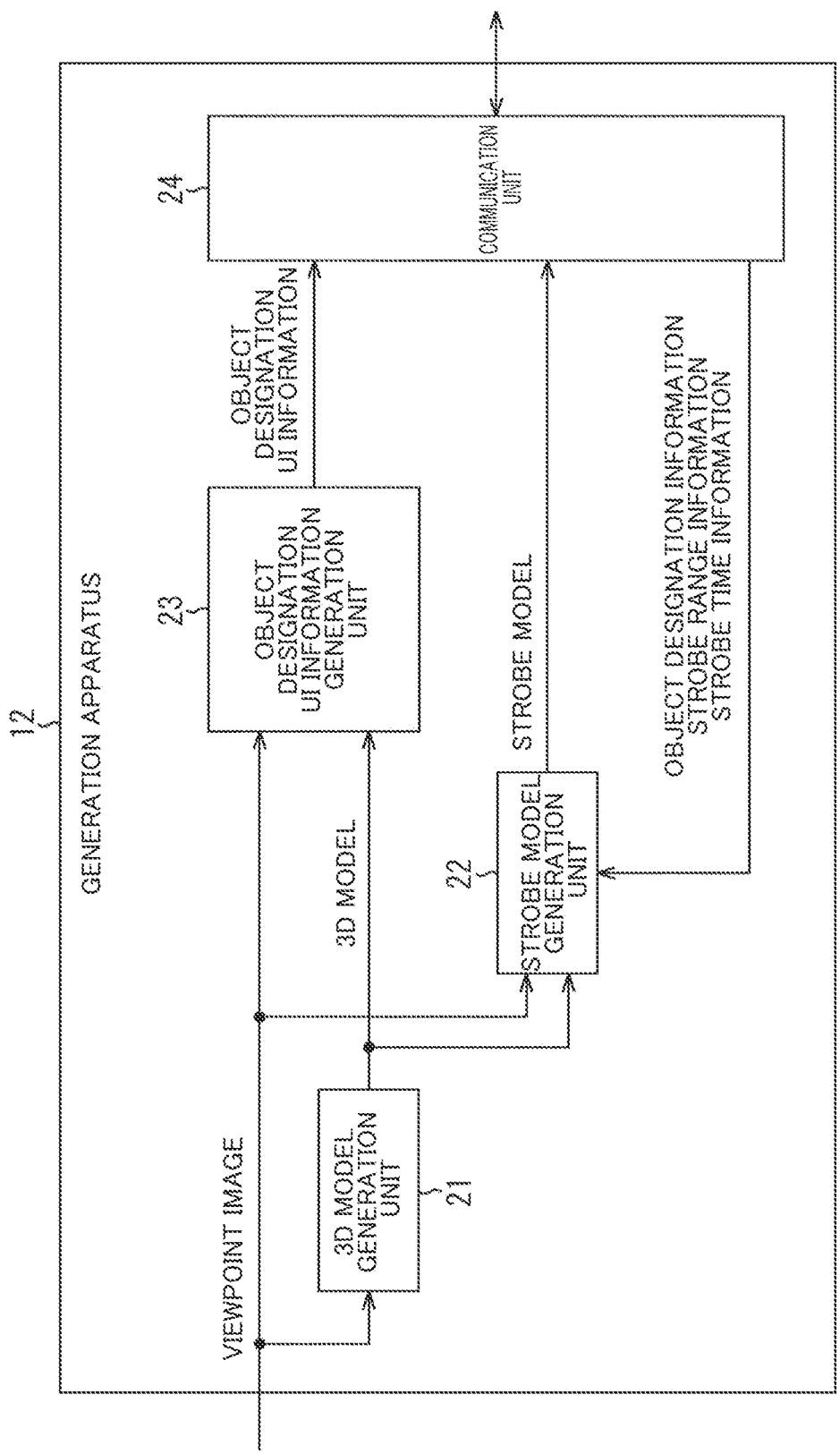
FIG. 2 is a block diagram illustrating a configuration example of a generation apparatus 12.

FIG. 2 is a block diagram illustrating a configuration example of the generation apparatus 12 in FIG. 1.

The generation apparatus 12 includes a 3D model generation unit 21, a strobe model generation unit 22, an object designation UI information generation unit 23, and a communication unit 24.

The 3D model generation unit 21 generates a 3D model that is free viewpoint data in units of frames from the viewpoint images and the depth images at the plurality of viewpoints from the photographing apparatus 11. The 3D model generation unit 21 functions as a part of a generation unit that generates 3D models of an object generated from the plurality of viewpoint images captured from the plurality of viewpoints, from the viewpoint images at the plurality of times, to create a strobe model in which 3D models at a plurality of times of the object are disposed in a three-dimensional space.

Here, the 3D model broadly means data of a 3D image from which a free viewpoint image can be generated. As the 3D model, for example, a set of the viewpoint images and the depth images at the plurality of viewpoints from the photographing apparatus 11 can be adopted as it is. Further, for example, 3D data having a 3D shape model that is 3D shape information and color information, or a set of 2D images and depth images at the plurality of viewpoints can be adopted as the 3D model.

When the set of viewpoint images and the depth images at the plurality of viewpoints from the photographing apparatus 11 is adopted as the 3D model, the 3D model generation unit 21 outputs the set of the viewpoint images and the depth images at the plurality of viewpoints from the photographing apparatus 11, as the 3D model.

When 3D data having a 3D shape model and color information is adopted as the 3D model, the 3D model generation unit 21 performs modeling based on Visual Hull or the like using the viewpoint images at the plurality of viewpoints from the photographing apparatus 11 and the depth images at the plurality of viewpoints to generate the 3D shape model of the object reflected in the viewpoint image, and outputs the 3D shape model as the 3D model. When the viewpoint of the depth image from the photographing apparatus 11 differs from the viewpoint of the viewpoint image from the photographing apparatus 11, the 3D model generation unit 21 can generate the depth image of the viewpoint of the viewpoint image from the photographing apparatus 11 using the depth images at the plurality of viewpoints from the photographing apparatus 11.

When the set of the 2D images and the depth images at the plurality of viewpoints is adopted as the 3D model, the 3D model generation unit 21 generates, for example, the 3D model having the 3D shape model and the color information as described above, and generates the set of the 2D images and the depth image when the 3D model is viewed from the plurality of viewpoints (which may be the same viewpoints as those of the cameras constituting the photographing apparatus 11 or may be different viewpoints). The 3D model generation unit 21 outputs the set of the 2D image and the depth image at the plurality of viewpoints as the 3D model.

The 3D model output by the 3D model generation unit 21 is supplied to the strobe model generation unit 22 and the object designation UI information generation unit 23.

It is possible to reduce an amount of data of the 3D model by adopting a set of 2D images and depth images at a plurality of viewpoints rather than a 3D model having a 3D shape model as the 3D model. A technology of generating and transmitting a set of 2D images and depth images at a plurality of viewpoints as a 3D model is described in WO 2017/082076 previously proposed by the applicant. The set of 2D images and depth images at the plurality of viewpoints as the 3D model targets can be encoded using, for example, an encoding scheme in which 2D images are targets, such as MVCD (Multiview and depth video coding), AVC (Advanced Video Coding), or HEVC (High Efficiency Video Coding).

Here, (a representation format of) the 3D model is roughly divided into a model called View Independent (hereinafter also referred to as a VI model) and a model called View Dependent (hereinafter also referred to as a VD model).

The VD model is a 3D model in which information on a three-dimensional shape of a 3D shape model or the like and information on an image serving as a texture are separated. In the VD model, the 3D shape model is colored by the image serving as the texture being mapped thereto (texture mapping). According to the VD model, it is possible to represent, for example, a degree of reflection on a surface of the object that differs depending on (virtual) viewpoints.

The VI model is, for example, a 3D model in which polygons or points serving as components of the information on the three-dimensional shape have color information. An example of the VI model includes a set of a colored point cloud or a 3D shape model and a UV map serving as color information of the 3D shape model. According to the VI model, colors of the polygons or points are observed from any (virtual) viewpoint.

The strobe model generation unit 22 generates a strobe model in which the 3D model of the same object in a plurality of frames (different times) of the viewpoint image is disposed in (the 3D model of) the three-dimensional space reflected in the viewpoint image using the viewpoint images at the plurality of viewpoints from the photographing apparatus 11 and the 3D model from the 3D model generation unit 21 according to the object designation information, the strobe range information, and the strobe time information supplied from the communication unit 24.

That is, the strobe model generation unit 22 selects a frame to be used for generation of the strobe model (hereinafter also referred to as a generation frame) from among frames in the strobe section indicated by the strobe time information. Further, the strobe model generation unit 22 sets the key object indicated by the object designation information as the target object. Further, the strobe model generation unit 22 sets, according to the degree of object relevance indicating a degree of relevance between a key object and an object other than the key object reflected in the generation frame (such an object is hereinafter also referred to as a non-key object), the non-key object of which the degree of object relevance is equal to or higher than a threshold value, as the target object.

For example, the strobe model generation unit 22 sets, as the target object, a non-key object of which the positional relationship matches the range indicated by the strobe range information according to the strobe range information and the positional relationship (distance) between the key object and the non-key object as the degree of object relevance.

Here, it is possible to adopt, as the degree of object relevance, for example, a value indicating a relevance of a role, function, property, and the like between the key object and the non-key object, in addition to the positional relationship between the key object and the non-key object. For example, in a case in which the viewpoint image is an image obtained by photographing a soccer match, when a key object is a field player holding a soccer ball, it is possible to adopt (set) a high degree of object relevance for a goalkeeper of an opponent team serving as a non-key object as compared with other players. Further, a value indicating a different type of relevance can be adopted as the degree of object relevance for each object. For example, for a certain non-key object, the positional relationship between the key object and the non-key object can be adopted as the degree of object relevance, and for other non-key objects, a value indicating a relevance between roles of the key object and the non-key object can be adopted as the degree of object relevance.

The strobe model generation unit 22 generates the strobe model in which the 3D model of the target object reflected in the generation frame is disposed, and supplies the strobe model to the communication unit 24. The strobe model generation unit 22 functions as the rest of the generation unit that generates the 3D models of the object generated from the plurality of viewpoint images captured from the plurality of viewpoints, from the viewpoint images at the plurality of times, and generates a strobe model in which the 3D models of the object at the plurality of times are disposed in a three-dimensional space.

The object designation UI information generation unit 23 generates the object designation UI information using the viewpoint image from the photographing apparatus 11 or the 3D model from the 3D model generation unit 21, and supplies the object designation UI information to the communication unit 24.

The communication unit 24 performs communication with the display apparatus 13. That is, the communication unit 24 transmits the object designation UI information from the object designation UI information generation unit 23 and the strobe model from the strobe model generation unit 22 to the display apparatus 13. Further, the communication unit 24 receives the object designation information, the strobe range information, and the strobe time information transmitted from the display apparatus 13 and supplies these to the strobe model generation unit 22. <Configuration Example of Display Apparatus 13>

Figure 3:
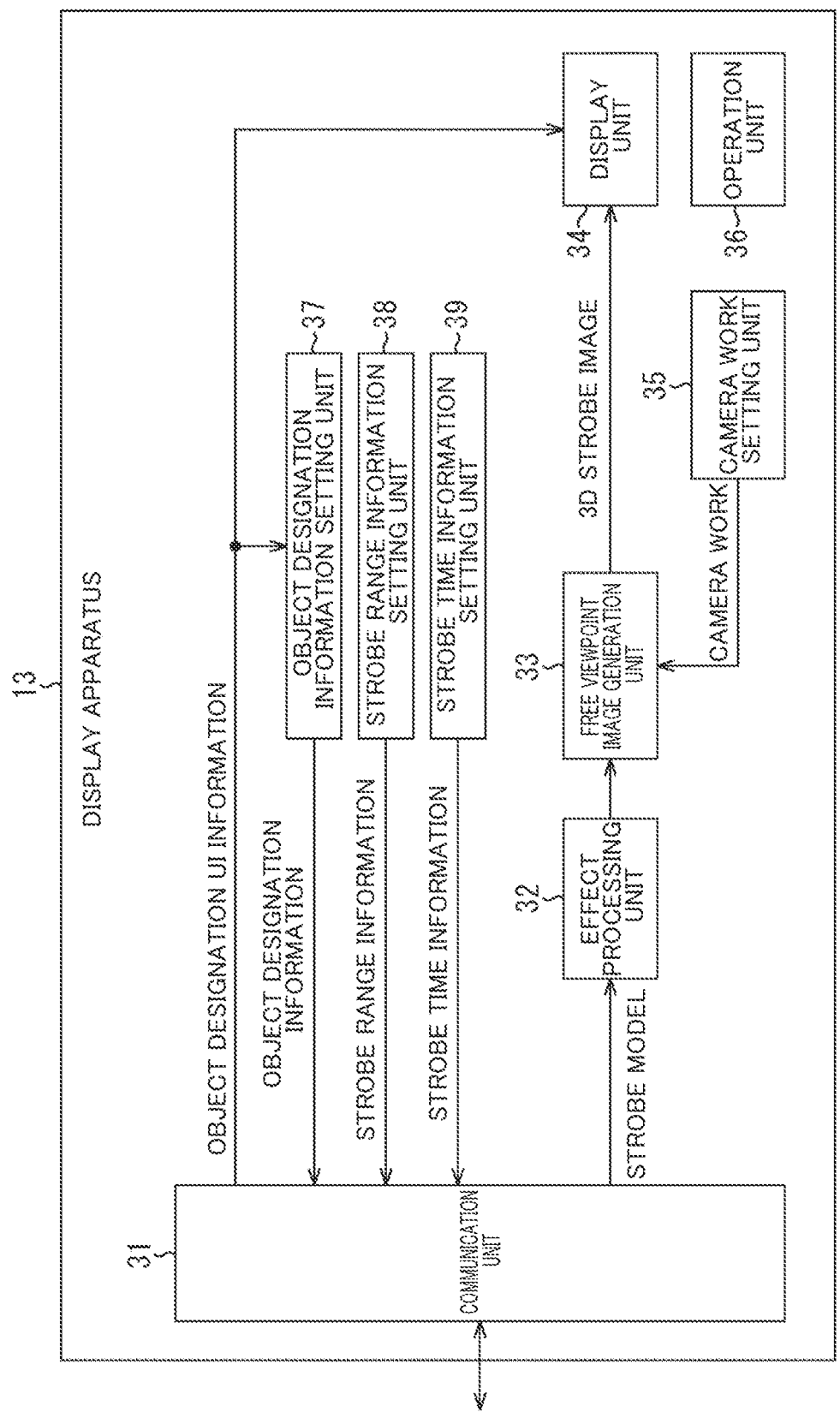
FIG. 3 is a block diagram illustrating a configuration example of a display apparatus 13.

FIG. 3 is a block diagram illustrating a configuration example of the display apparatus 13 in FIG. 1.

The display apparatus 13 includes a communication unit 31, an effect processing unit 32, a free viewpoint image generation unit 33, a display unit 34, a camera work setting unit 35, an operation unit 36, an object designation information setting unit 37, a strobe range information setting unit 38, and a strobe time information setting unit 39.

The communication unit 31 performs communication with the generation apparatus 12. That is, the communication unit 31 transmits object designation information from the object designation information setting unit 37, strobe range information from the strobe range information setting unit 38, and strobe time information from the strobe time information setting unit 39 to the generation apparatus 12. Further, the communication unit 31 receives the object designation UI information and the strobe model transmitted from the generation apparatus 12. The communication unit 31 supplies the strobe model to the effect processing unit 32, and supplies the object designation UI information to the display unit 34 and the object designation information setting unit 37.

The effect processing unit 32 performs effect processing on the 3D models (of the target object) disposed in the strobe model from the communication unit 31 according to an operation of the user with respect to the operation unit 36, for example, and supplies a result of the effect processing to the free viewpoint image generation unit 33.

For example, the effect processing unit 32 can set, for example, the 3D model at a latest time or the 3D model designated according to the operation of the user among the 3D models of the object disposed in the strobe model, as a reference 3D model, and perform effect processing on 3D models in one or both of past and future from the reference 3D model.

The free viewpoint image generation unit 33 generates a moving image of the 3D strobe image that is a 2D image obtained by photographing the strobe model from the effect processing unit 32 with a virtual camera according to the camera work from the camera work setting unit 35, as (data of) a free viewpoint image, and supplies the moving image to the display unit 34.

That is, the free viewpoint image generation unit 33 generates the moving image of the 3D strobe image as the free viewpoint image by rendering the image when the strobe model is viewed from the photographing position included in the camera work from the camera work setting unit 35.

Here, the strobe image is an image in which one or more same objects (images) photographed at a plurality of times are reflected. A strobe image in which an object reflected in the 2D image is reflected is also referred to as a 2D strobe image, and a 2D image in which the 3D model of the object is reflected, that is, a 2D image when the strobe model is viewed from a predetermined viewpoint is also referred to as a 3D strobe image. The free viewpoint image generation unit 33 generates the 3D strobe image.

The display unit 34 displays an object designation UI serving as a clue for designating an object (subject) of which a strobe model is generated according to the object designation UI information from the communication unit 31. Further, the display unit 34 displays the 3D strobe image from the free viewpoint image generation unit 33.

The display unit 34 can be configured of, for example, a 2D head-mounted display, a 2D monitor, a 3D head-mounted display, or a 3D monitor. The 3D head-mounted display or monitor is, for example, a display apparatus that realizes stereoscopic vision by displaying a 2D image for a left eye and a 2D image for a right eye.

The camera work setting unit 35 sets a camera work of the virtual camera when the 3D strobe image is generated by photographing the strobe model with the virtual camera according to the operation of the user with respect to the operation unit 36 or the like, and supplies the camera work to the free viewpoint image generation unit 33.

The camera work of the virtual camera is information on all photographing work (procedures) when photographing is performed with the virtual camera and includes, for example, camera parameters such as a position (photographing position) or attitude (photographing attitude) (photographing direction), and an angle of view (zoom magnification) of the virtual camera. The photographing position of the virtual camera can be represented by, for example, coordinates of an xyz coordinate system serving as a world coordinate system, and the photographing attitude of the virtual camera can be represented by, for example, a rotation angle around each axis of the xyz coordinate system.

The operation unit 36 is operated by the user and supplies operation information according to the operation of the user to blocks needing the operation information. The operation unit 36 can be integrally configured with the display unit 34 by, for example, a touch panel or the like. However, the operation unit 36 can be configured separately from the display unit 34.

The object designation information setting unit 37 sets the object designation information according to the operation of the user with respect to the operation unit 36 and supplies the object designation information to the communication unit 31.

The strobe range information setting unit 38 sets the strobe range information according to the operation of the user with respect to the operation unit 36 and supplies the strobe range information to the communication unit 31.

The strobe time information setting unit 39 sets the strobe time information according to the operation of the user with respect to the operation unit 36 and supplies the strobe time information to the communication unit 31.

Here, in the generation apparatus 12, a non-key object of which a degree of object relevance to the key object is equal to or higher than a threshold value is set as the target object in addition to the key object, and a strobe model in which a 3D model of the target object is disposed is generated, as described with reference to FIG. 2. According to such a strobe model, it is possible to generate an effective 3D strobe image.

For example, when tactical analysis or coaching of sports played by a plurality of people is performed or when a live image of a sports game is shown to fans, it is possible to generate a 3D strobe image in which not only a player designated as a key object by a user, but also other players around that player are reflected. Further, for example, when a viewpoint image is an image obtained by photographing a soccer match, it is possible to generate a 3D strobe image in which, when the user designates a field player holding a soccer ball as a key object, the soccer ball, other players, or the like near the field player serving as the key object are reflected together with the field player serving as the key object even when the user does not designate the soccer ball, the other field players, or the like as the key object.

<Generation Processing>

Figure 4:
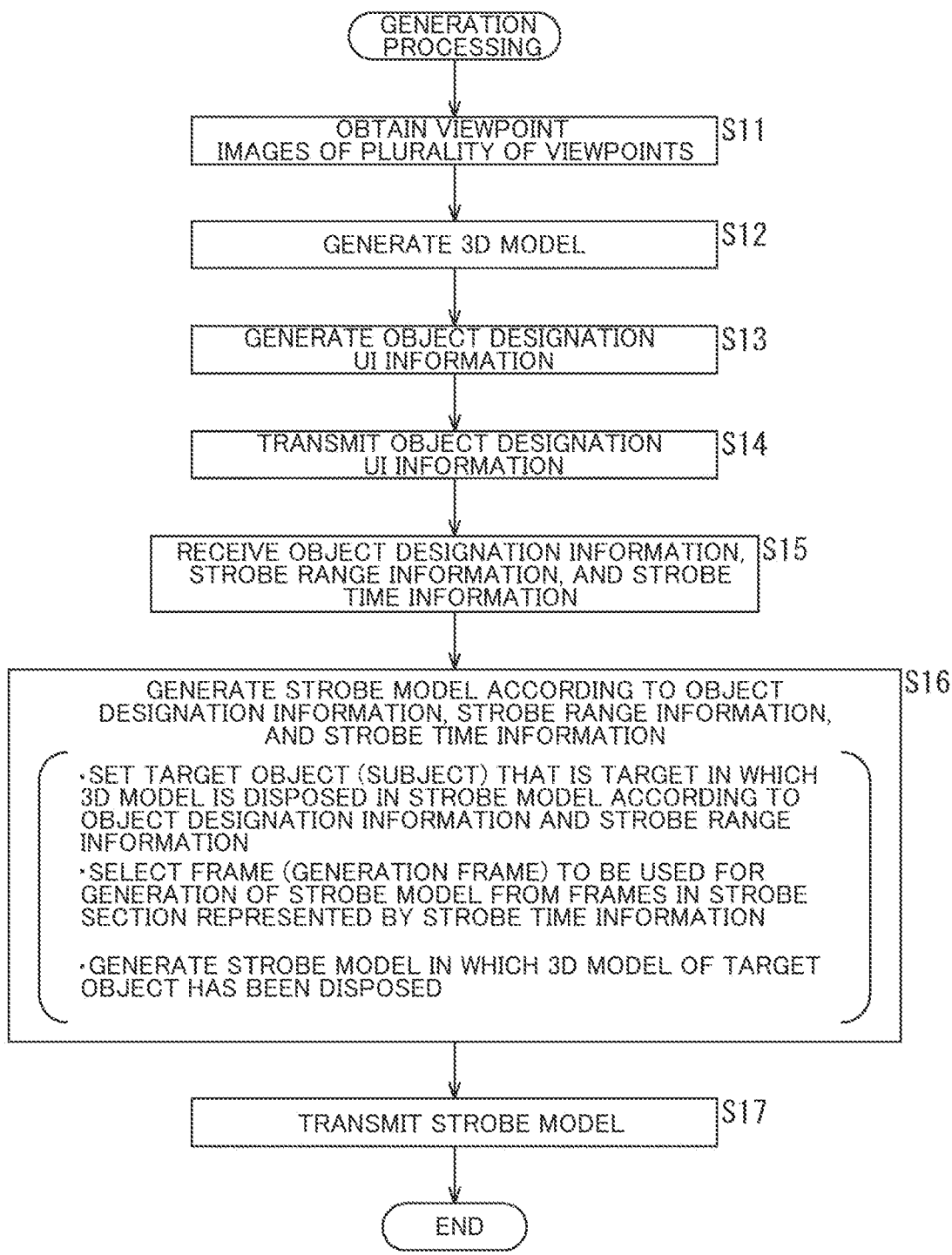
FIG. 4 is a flowchart illustrating an example of generation processing that is performed by the generation apparatus 12.

FIG. 4 is a flowchart illustrating an example of generation processing that is performed by the generation apparatus 12 in FIG. 2.

In the generation processing, in step S11, the generation apparatus 12 obtains viewpoint images (and depth images) at a plurality of viewpoints captured by the photographing apparatus 11. The generation apparatus 12 supplies the viewpoint images at the plurality of viewpoints to the 3D model generation unit 21, the strobe model generation unit 22, and the object designation UI information generation unit 23, and the processing proceeds from step S11 to step S12. The viewpoint images at the plurality of viewpoints captured by the photographing apparatus 11 can be obtained by the display apparatus 13 and transmitted from the display apparatus 13 to the generation apparatus 12.

In step S12, the 3D model generation unit 21 generates a 3D model of the object reflected in the viewpoint image in units of frames using the viewpoint images at the plurality of viewpoints. The 3D model generation unit 21 supplies the 3D model of the object to the strobe model generation unit 22 and the object designation UI information generation unit 23, and the processing proceeds to step S13.

In step S13, the object designation UI information generation unit 23 generates the object designation UI information using the viewpoint image or the 3D model from the 3D model generation unit 21 as necessary. The object designation UI information generation unit 23 supplies the object designation UI information to the communication unit 24, and the processing proceeds from step S13 to step S14.

In step S14, the communication unit 24 transmits the object designation UI information from the object designation UI information generation unit 23 to the display apparatus 13, and the processing proceeds to step S15.

In step S15, the communication unit 24 waits for the object designation information, the strobe range information, and the strobe time information to be transmitted from the display apparatus 13, and receives the object designation information, the strobe range information, and the strobe time information. The communication unit 24 supplies the object designation information, the strobe range information, and the strobe time information to the strobe model generation unit 22, and the processing proceeds from step S15 to step S16.

In step S16, the strobe model generation unit 22 generates the strobe model according to the object designation information, the strobe range information, and the strobe time information from the communication unit 24 using the viewpoint image and the 3D model from the 3D model generation unit 21.

That is, the strobe model generation unit 22 sets the target object that is a target in which the 3D model is disposed in the strobe model from the object reflected in the viewpoint image according to the object designation information and the strobe range information.

Further, the strobe model generation unit 22 selects a generation frame to be used for generation of the strobe model from among the frames in the strobe section indicated by the strobe time information.

Here, when all the frames in the strobe section are used as the generation frames for generation of the strobe model, the same number of 3D models of the same object as the number of frames in the strobe section may be overlapped and disposed in the strobe model, and the 3D strobe image may be an image which difficult to be seen.

Therefore, the strobe model generation unit 22 can select some frames as generation frames from among the frames in the strobe section, and generate the strobe model using the generation frames (3D model of the object reflected in the generation frames).

The strobe model generation unit 22, for example, can select, as the generation frame, a frame in which a degree of interference of the 3D models of the target object is equal to or smaller than a threshold value from among the frames in the strobe section. That is, the strobe model generation unit 22 calculates the degree of interference indicating a degree of overlapping between the 3D models in a state in which the 3D model of the target object reflected in the frame in the strobe section is disposed in the three-dimensional space. The degree of interference is calculated as 100%, for example, when 3D models of any two frames completely overlap in a three-dimensional space, and as 0% when the 3D models do not overlap at all. The strobe model generation unit 22 selects a frame of which a degree of interference is equal to or smaller than a predetermined threshold value as the generation frame. As described above, the frame of which the degree of interference of the 3D model is equal to or smaller than the threshold value is selected as the generation frame from among the frames in the strobe section, and the strobe model in which the 3D model of the target object reflected in the generation frame is disposed is generated, thereby preventing the 3D strobe image from being an image difficult to see due to overlapping disposition of the 3D models in the strobe model.

In the selection of the generation frame, for example, the frame in the strobe section can also be simply selected as the generation frame for each predetermined number of frames.

The strobe model generation unit 22 generates a strobe model in which the 3D models of the target object reflected in the plurality of generation frames selected from among the frames in the strobe section are disposed in, for example, (3D model of) a background serving as a three-dimensional space when the target object is photographed.

The strobe model generation unit 22 supplies the strobe model to the communication unit 24, and the processing proceeds from step S16 to step S17.

In step S17, the communication unit 24 transmits the strobe model from the strobe model generation unit 22 to the display apparatus 13, and the generation processing ends.

<Display Processing>

Figure 5:
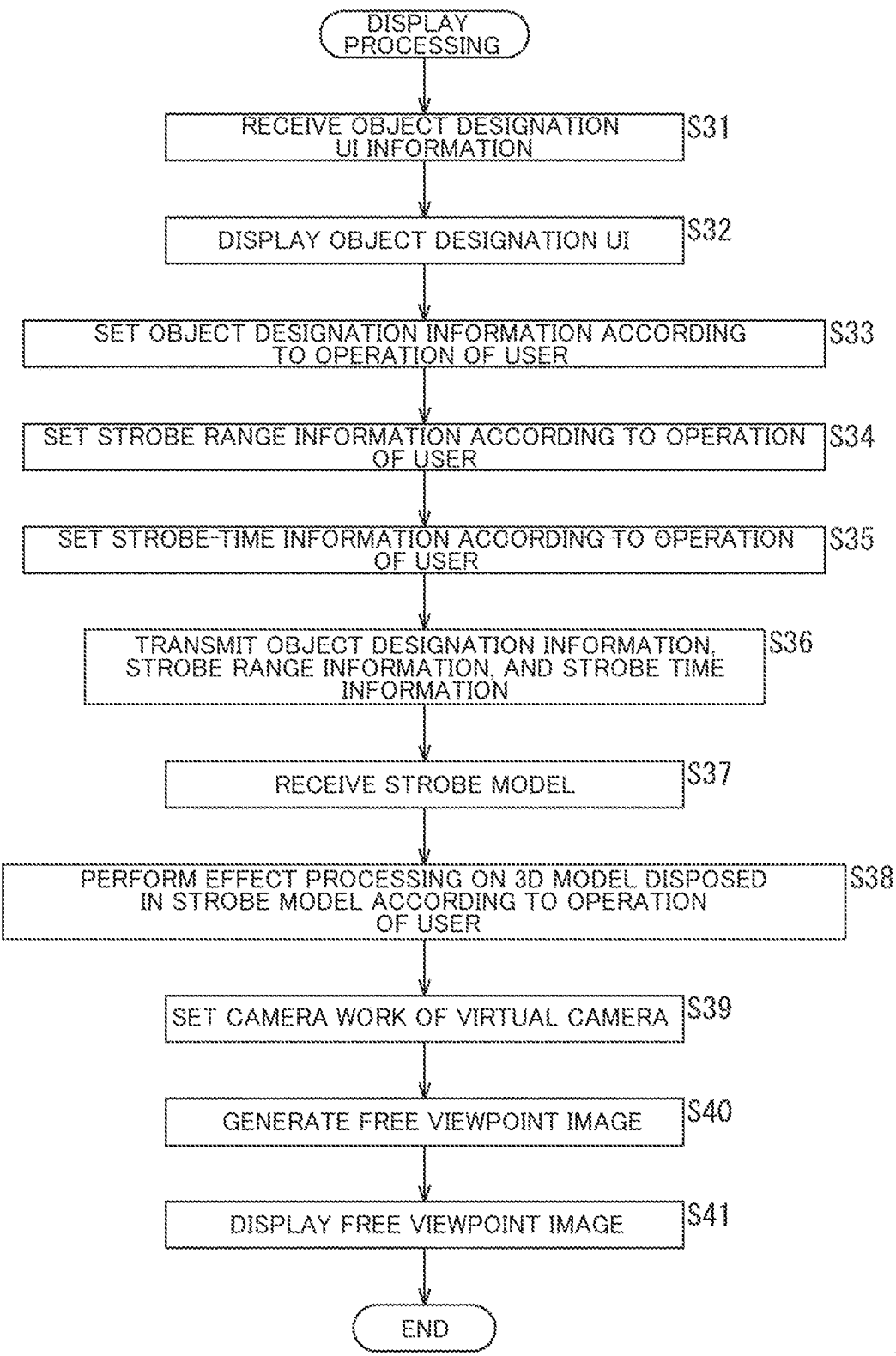
FIG. 5 is a flowchart illustrating an example of display processing that is performed by the display apparatus 13.

FIG. 5 is a flowchart illustrating an example of display processing that is performed by the display apparatus 13 in FIG. 3.

In the display processing, in step S31, the communication unit 31 waits for the object designation UI information to be transmitted from the generation apparatus 12 and receives the object designation UI information. The communication unit 31 supplies the object designation UI information to the display unit 34 and the object designation information setting unit 37, and the processing proceeds from step S31 to step S32.

In step S32, the display unit 34 displays the object designation UI serving as a clue for designating the object for generating the strobe model according to the object designation UI information from the communication unit 31, and the processing proceeds to step S33.

In step S33, the object designation information setting unit 37 sets the key object according to the operation of the user with respect to the object designation UI displayed on the display unit 34. Further, the object designation information setting unit 37 sets (generates) object designation information indicating a key object. The object designation information setting unit 37 supplies the object designation information to the communication unit 31, and the processing proceeds from step S33 to step S34.

In step S34, the strobe range information setting unit 38 sets the strobe range information according to the operation of the user and supplies the strobe range information to the communication unit 31, and the processing proceeds to step S35.

In step S35, the strobe time information setting unit 39 sets the strobe time information according to the operation of the user and supplies the strobe time information to the communication unit 31, and the processing proceeds to step S36.

In step S36, the communication unit 31 transmits the object designation information from the object designation information setting unit 37, the strobe range information from the strobe range information setting unit 38, and the strobe time information from the strobe time information setting unit 39 to the generation apparatus 12 and the processing proceeds to step S37.

In step S37, the communication unit 31 waits for the strobe model to be transmitted from the generation apparatus 12 and receives the strobe model. The communication unit 31 supplies the strobe model from the generation apparatus 12 to the effect processing unit 32, and the processing proceeds from step S37 to step S38.

In step S38, the effect processing unit 32 performs effect processing on the 3D models (of the target object) disposed in the strobe model according to the operation of the user. For example, the effect processing unit 32 performs effect processing on 3D models in one or both of the past and future from the reference 3D model designated according to the operation of the user or the like among 3D models at a plurality of times (generation frames) disposed in the strobe model.

The effect processing unit 32 supplies the strobe model (in which the 3D model has been disposed) after the effect processing to the free viewpoint image generation unit 33, and the processing proceeds from step S38 to step S39. The effect processing unit 32 can supply the strobe model to the free viewpoint image generation unit 33 without performing the effect processing on the strobe model according to an operation of the user or the like.

In step S39, the camera work setting unit 35 sets the camera work of the virtual camera according to an operation of the user, a state of the 3D model of the target object disposed in the strobe model, and the like. The camera work setting unit 35 supplies the camera work to the free viewpoint image generation unit 33, and the processing proceeds from step S39 to step S40.

In step S40, the free viewpoint image generation unit 33 generates the free viewpoint image serving as the 3D strobe image obtained by photographing the strobe model from the effect processing unit 32 with the virtual camera according to the camera work from the camera work setting unit 35 through rendering. The free viewpoint image generation unit 33 supplies the 3D strobe image to the display unit 34, and the processing proceeds from step S40 to step S41.

In step S41, the display unit 34 displays the 3D strobe image from the free viewpoint image generation unit 33, and the display processing ends. Accordingly, a 2D image in which the 3D model of the object reflected in the plurality of generation frames viewed from the photographing position of the strobe model with the virtual camera as the 3D strobe image is reflected is displayed in the display unit 34.

<Generation of 3D Strobe Image>

Figure 6:
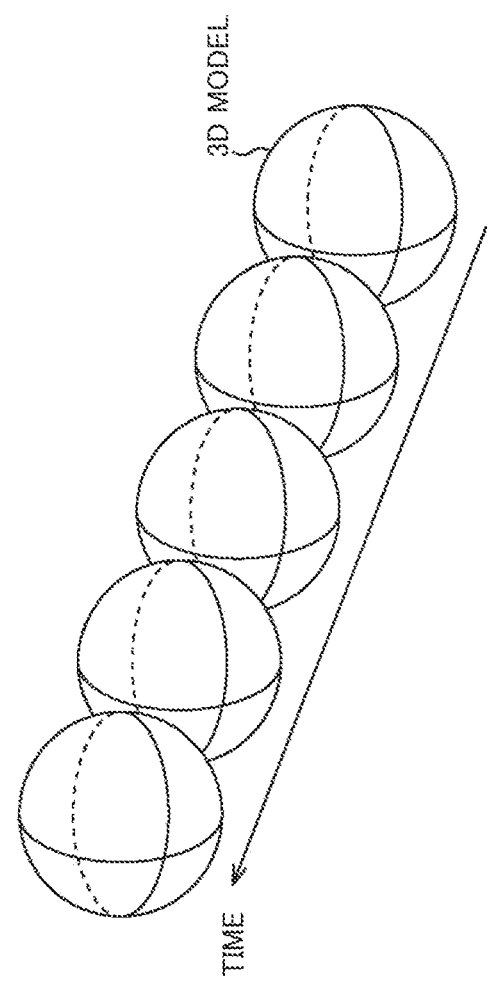
FIG. 6 is a diagram illustrating an example of an unnatural 3D strobe image.

FIG. 6 is a diagram illustrating an example of an unnatural 3D strobe image.

FIG. 6 illustrates an example of a 3D strobe image generated from a strobe model generated using, as a generation frame, five frames among frames of the viewpoint image obtained by photographing a ball as an object rolling from the front side to the back side.

In FIG. 6, the 3D models of the ball reflected in the generation frame of the five frames are disposed (rendered) so that the 3D model following in time is prioritized. Therefore, the 3D model (of the ball) following in time is disposed to hide the 3D model on the front side preceding in time even though the 3D model following in time is located on the back side. As a result, the 3D strobe image in FIG. 6 is an unnatural image.

Figure 7:
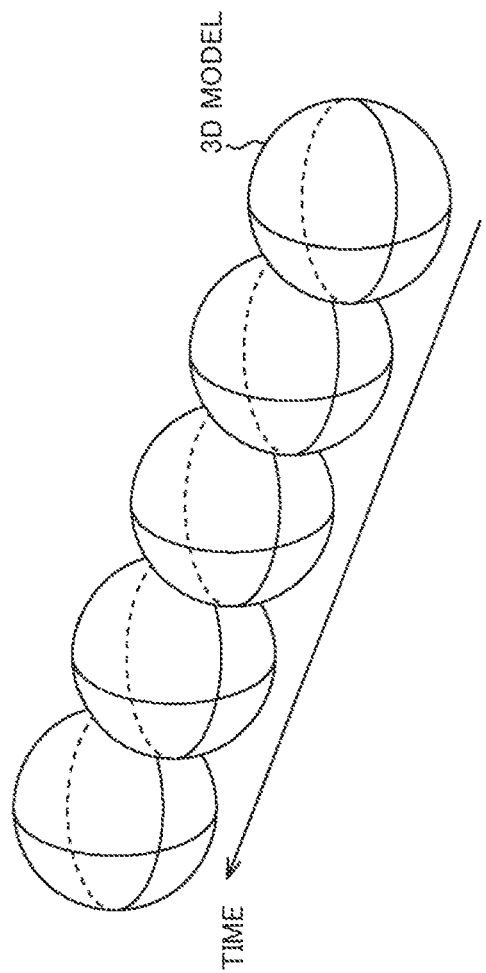
FIG. 7 is a diagram illustrating an example of a natural 3D strobe image.

FIG. 7 is a diagram illustrating an example of a natural 3D strobe image.

FIG. 7 illustrates an example of a 3D strobe image generated from a strobe model generated using, as a generation frame, five frames among frames of the viewpoint image obtained by photographing a ball as an object rolling from the front side to the back side.

In FIG. 7, the 3D models of the ball reflected in the generation frame of the five frames is disposed so that the 3D model on the front side is prioritized. Therefore, the 3D model on the front side is disposed so that the 3D model on the front side hides the 3D model on the back side, that is, the 3D model on the front side is preferentially reflected. As a result, the 3D strobe image in FIG. 7 is a natural image.

The free viewpoint image generation unit 33 generates the 3D strobe image in which the 3D model of the object on the front side is preferentially reflected as described above (performs photographing with a virtual camera) using the depth of the 3D model of each object disposed in the strobe model.

Figure 8:
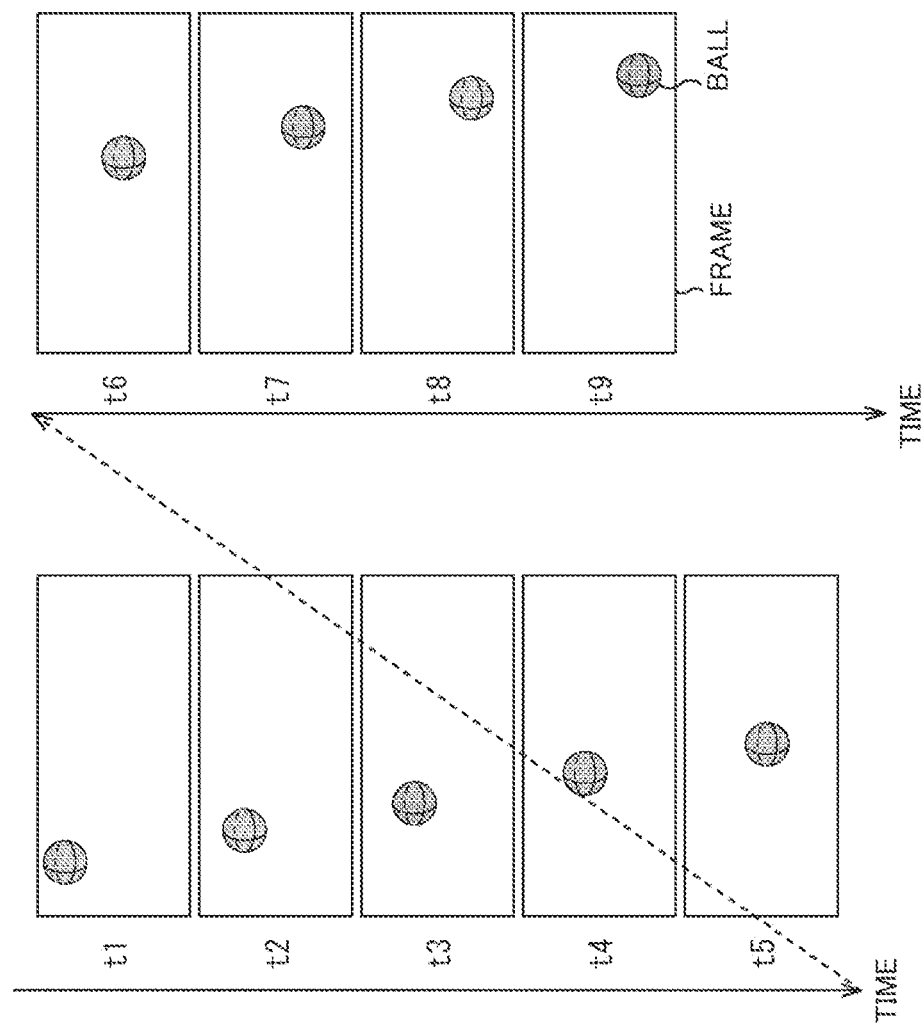
FIG. 8 is a diagram illustrating an example of a frame of a viewpoint image in a strobe section.

FIG. 8 is a diagram illustrating an example of a frame of the viewpoint image in the strobe section.

In FIG. 8, nine frames at times t1 to t9 are frames of the viewpoint image in the strobe section. A ball as an object rolling from left to right is reflected in the frames at times t1 to t9.

Figure 9:
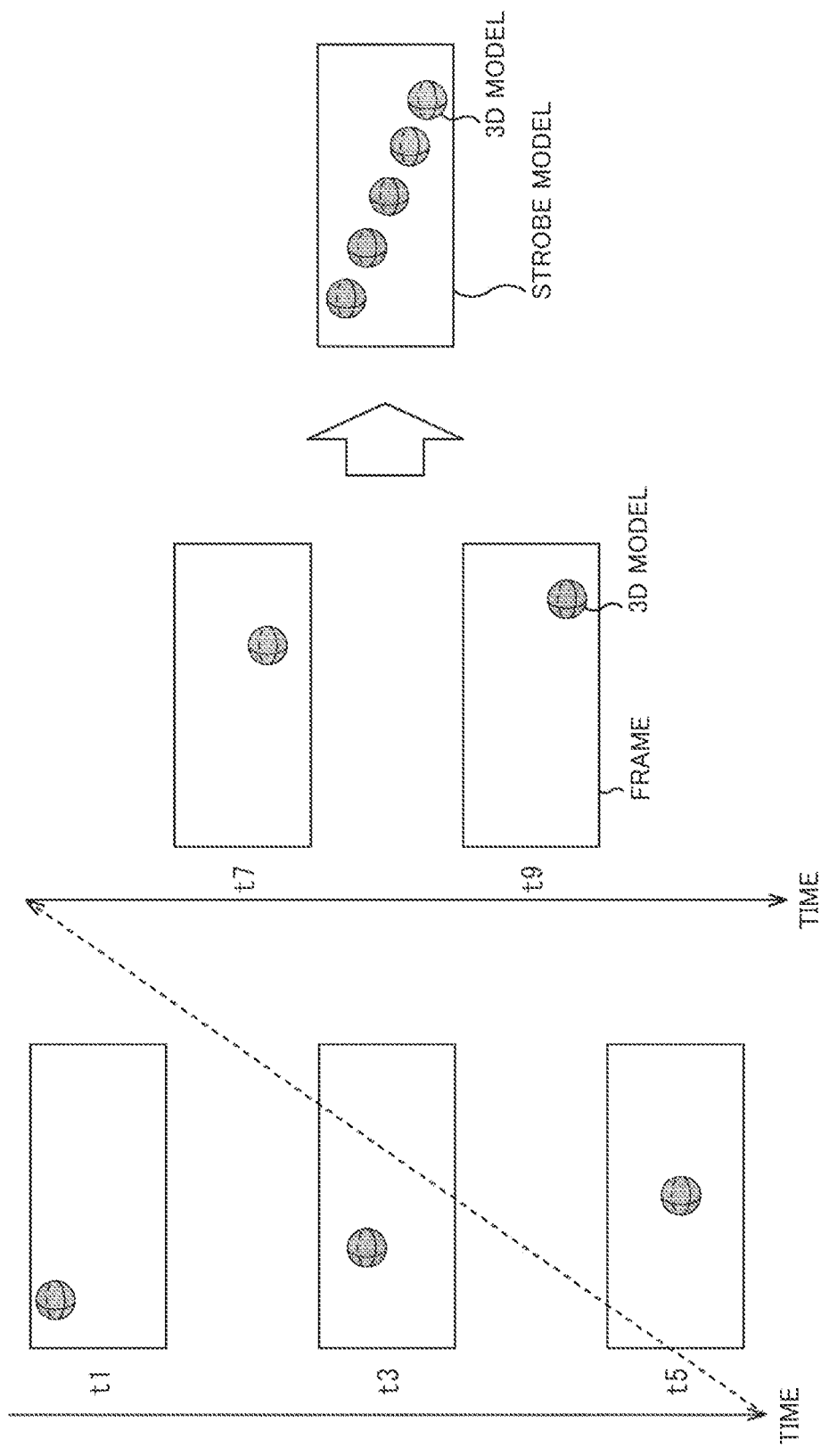
FIG. 9 is a diagram illustrating an example of generation of a strobe model using a frame at times t1 to t9 as the strobe section.

FIG. 9 is a diagram illustrating an example of generation of the strobe model using frames at times t1 to t9 serving as the strobe section.

In FIG. 9, the frames at times t1, t3, t5, t7, and t9 among the frames at times t1 to t9 serving as the strobe section are selected as the generation frames, and 3D models of the ball as an object reflected in the frames at times t1, t3, t5, t7, and t9 serving as the generation frames of the viewpoint images at the plurality of viewpoints are generated. A strobe model in which the 3D models of the ball reflected in the frames of the times t1, t3, t5, t7, and t9 serving as the generation frames are disposed is generated.

Figure 10:
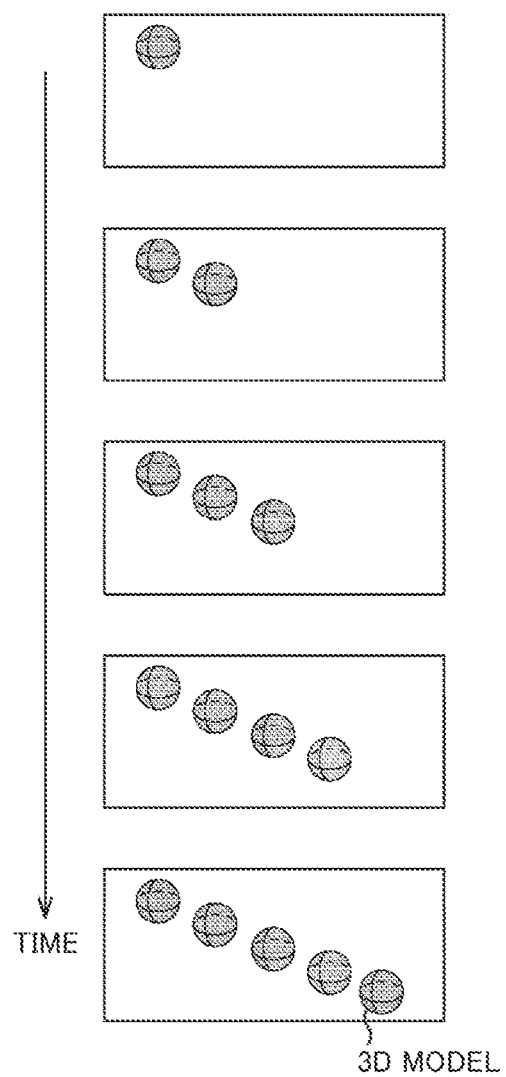
FIG. 10 is a diagram illustrating an example of a display of a 3D strobe image that is generated by photographing a strobe model with a virtual camera.

FIG. 10 is a diagram illustrating an example of a display of the 3D strobe image generated by photographing the strobe model with the virtual camera.

As the moving image of the 3D strobe image, a frame in which the 3D model of the ball as the object reflected in the frame at time t1 is reflected, a frame in which the 3D model of the ball as the object reflected in the frames at times t1 and t3 is reflected, a frame in which the 3D model of the ball as the object reflected in the frames at times t1, t3, and t5 is reflected, a frame in which the 3D model of the ball as the object reflected in the frames at times t1, t3, t5, and t7 is reflected, and a frame in which the 3D model of the ball as the object reflected in the frames at times t1, t3, t5, t7, and t9 is reflected can be generated from the strobe model in FIG. 9 and sequentially displayed.

In the 3D strobe image in FIG. 10, the photographing position of the virtual camera that photographs the strobe model is not changed, but the photographing position of the virtual camera can be changed according to the camera work. It is possible to photograph, for example, the strobe model in which the 3D models of the ball as the object reflected in the frames at times t1, t3, t5, t7, and t9 are disposed, with the virtual camera while changing the photographing position. When the photographing position is changed, a viewpoint at which the strobe model is viewed is changed, and a 3D strobe image in which a camera angle changes is displayed.

<3D Model that is Effect Processing Target>

Figure 11:
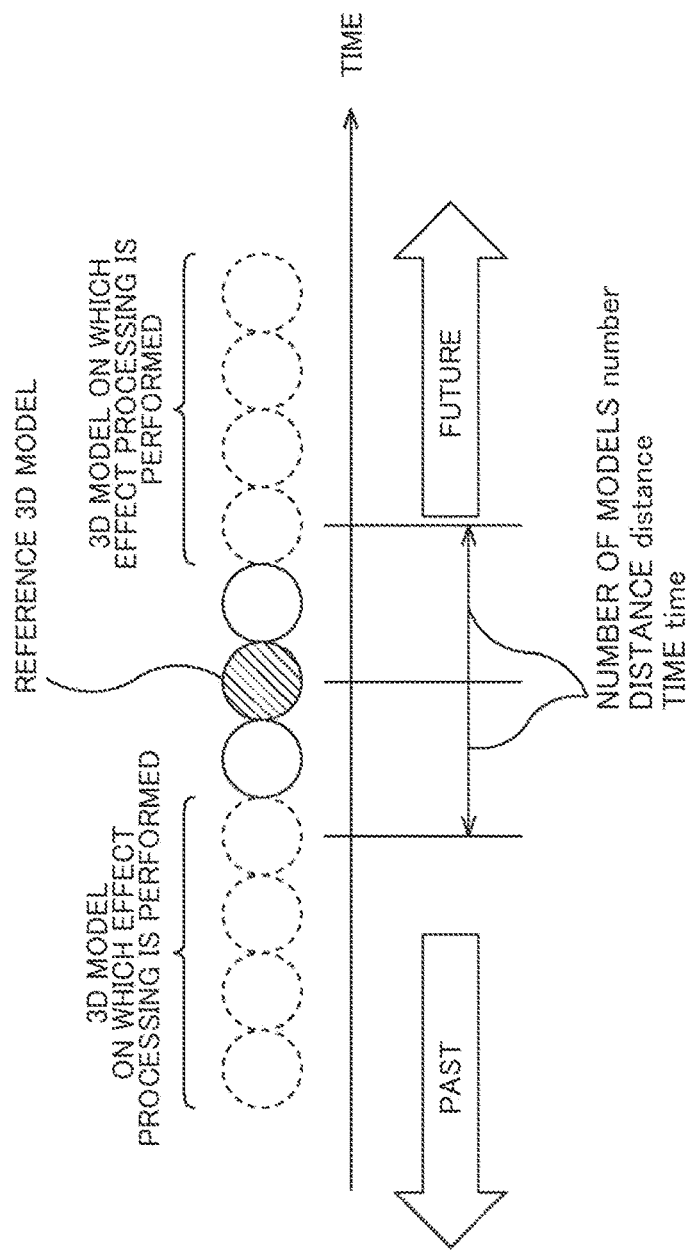
FIG. 11 is a diagram illustrating a 3D model that is a target of effect processing in a strobe model.

FIG. 11 is a diagram illustrating a 3D model that is an effect processing target in the effect processing unit 32 in FIG. 3 in the strobe model.

The effect processing unit 32 can perform effect processing on the 3D models in one or both of the past and future from the reference 3D model among the 3D models of the object reflected in the plurality of generation frames serving as the plurality of times selected from among the frames in the strobe section in the strobe model.

The target model, which is the 3D model that is a target on which the effect processing is performed, is specified by an effect direction indicating a time direction (a past direction and a future direction) with respect to the reference 3D model and an effect distance indicating a distance from the reference 3D model.

As the effect direction, a past direction past, a future direction future, or both the past direction past and the future direction future can be set.

When the past direction past is set as the effect direction, the effect processing is performed on a 3D model in the past direction from the reference 3D model. When the future direction future is set as the effect direction, the effect processing is performed on a 3D model in the future direction from the reference 3D model. When the past direction past and the future direction future are set as the effect directions, the effect processing is performed on the 3D model in the past direction from the reference 3D model and the 3D model in the future direction from the reference 3D model.

The effect distance can be designated by the number of models number, the distance distance, or the time time of the 3D model from the reference 3D model.

According to the number of models number, the 3D model away by the number of models number or more from the reference 3D model among the 3D models disposed in the strobe model, that is, the 3D models (of objects) reflected in the generation frame used for generation of the strobe model can be designated as the target model.

According to the distance distance, the 3D model away by the distance distance or more from the reference 3D model among the 3D models disposed in the strobe model can be designated as the target model.

According to the time time, the 3D model away the time time or more from the reference 3D model among the 3D models disposed in the strobe model can be designated as the target model.

The effect processing unit 32 sets the 3D model away by the number of models number, the distance distance, or the time time or more in the past direction, the future direction, or both the past and future directions from the reference 3D model in the strobe model as the target model and performs effect processing.

Hereinafter, it is assumed for simplicity of description that the effect processing is performed on the 3D model in the past direction from the reference 3D model, unless otherwise specified.

Here, when the strobe section is long and a large number of frames are selected as the generation frames, the strobe model is generated using a large number of 3D models.

The strobe model generated using the large number of 3D models may be an image difficult to see.

For example, in the strobe model generated using the large number of 3D models, a 3D model at a time before a certain time or more from the reference 3D model among 3D models of a predetermined object disposed in the strobe model may interfere with (viewing of) a (future) 3D model following in time or a 3D models of other objects.

Further, in a strobe model generated using a large number of 3D models, when the object moves with similar trajectories, for example, when the object makes so-called large wheels (rear wheels or front wheels) with a horizontal bar, a (past) 3D model preceding in time and a 3D model following in time describe similar trajectories, which may make it difficult to understand the passage of time.

Further, in the strobe model generated by using the large number of 3D models, the amount of data of the 3D model becomes large, and an amount of processing required for a display of (the free viewpoint image generated from) the strobe model becomes large.

The effect processing unit 32 can perform effect processing on the 3D models disposed in the strobe model to provide an easy-to-see strobe model, and can reduce an amount of data of the strobe model or an amount of processing required for a display of the strobe model.

<Specific Example of Effect Processing>

FIG. 12 is a diagram illustrating a specific example of effect processing.

In FIG. 12, an example of the effect processing includes effect processing represented by effect modes 0, 1, 2, 3, 4, 5, 6, 7, 8, 9, 10, 11, 12, 13, and 14. For effect modes 1 to 14, it is possible to set the effect direction and the effect distance described with reference to FIG. 11.

When the effect direction is not set, the past direction past, for example, is set as the effect direction by default, and the effect processing is performed.

The effect distance is designated by the number of models number of the 3D model, the distance distance, or the time time from the reference 3D model, as described with reference to FIG. 11. For example, when the effect direction is set to the past direction past and the effect distance is set to the number of models number=1, the 3D model away by the number of models number=1 or more in the past direction from the reference 3D model is set as the target model, and the effect processing indicated by the effect mode is performed.

Effect mode 0 indicates that no effect processing is performed.

Effect mode 1 indicates effect processing that makes a 3D model transparent. In the effect processing for effect mode 1, target models can all be made transparent with the same transparency or gradually made transparent, that is, the 3D models (target models) further away in terms of a time or distance from the reference 3D model can be made transparent with high transparency. A way of making the 3D model transparent can be designated by, for example, a defined parameter associated with effect mode 1. When the transparency is set to 100%, the target model becomes completely transparent and, in this case, a result of the effect processing for effect mode 1 is substantially the same as that of effect mode 4 that will be described below.

Effect mode 2 indicates effect processing for making the 3D model to disappear gradually.

Effect mode 3 indicates effect processing for reducing the number of textures (the number of 2D images used as textures) of the 3D model. In the effect processing for effect mode 3, the numbers of textures of the target models can all be reduced to the same number or gradually reduced, that is, when the 3D model is further away in terms of a time or distance from the reference 3D model, the number of textures can be reduced. A way of reducing the number of textures in the 3D model can be designated by, for example, a defined parameter associated with effect mode 3.

For the effect processing for effect mode 3, a 3D model on which texture mapping is performed, that is, a VD model is a target, and a VI model on which texture mapping is not performed is not a target.

Effect mode 4 indicates effect processing for erasing the 3D model.

Effect mode 5 indicates effect processing for reducing at least one of brightness and saturation of the 3D model. In the effect processing for effect mode 5, brightness and saturation of the target model can all be reduced by the same percentage or gradually reduced, that is, when the 3D model is further away in terms of a time or distance from the reference 3D model, it is also possible to increase a percentage of reduction of the brightness and saturation. A way of reducing the brightness and saturation of the 3D model or which of the brightness and saturation is to be reduced can be designated, for example, by a defined parameter associated with effect mode 5.

Effect mode 6 indicates effect processing for limiting the number of 3D models disposed in the strobe model. In the effect processing for effect mode 6, the 3D model disposed in the strobe model is limited to the 3D models other than the target models among the 3D models of the generation frame.

Effect mode 7 indicates effect processing for causing the 3D model to have fewer polygons, that is, effect processing for reducing the number of mesh cells (number of polygons) of the 3D model. In the effect processing for effect mode 7, the numbers of mesh cells of the target models can be reduced to the same number or gradually reduced, that is, the number of mesh cells of the 3D model further away in terms of a time or distance from the reference 3D model can be reduced. A way of reducing the number of mesh cells in the 3D model can be designated, for example, by a defined parameter associated with effect mode 7.

For the effect processing for effect mode 7, a 3D model composed of polygons is a target, a 3D model not composed of polygons, that is, a wireframe, for example, is not a target.

Effect modes 8 and 9 indicate effect processing for changing a representation format of the 3D model.

That is, effect mode 8 indicates effect processing for changing a 3D model composed of polygons into a wireframe.

Effect mode 9 indicates effect processing for changing a representation format of the 3D model from View Dependent to View Independent, that is, effect processing for changing the VD model to the VI model (for example, a point cloud).

Effect mode 10 indicates effect processing for erasing the 3D model and leaving evidence of the 3D model.

Effect mode 11 indicates effect processing for changing the texture (texture material) of the 3D model. A texture to which the texture of the 3D model is to be changed can be designated by, for example, a defined parameter associated with effect mode 11.

Effect mode 12 indicates effect processing for blurring (the shape) of the 3D model. A degree of 3D model blurring can be designated by, for example, a defined parameter associated with effect mode 12.

Effect mode 13 indicates effect processing for changing color of the 3D model. Color to which the color of the 3D model is to be changed can be designated by, for example, a defined parameter associated with effect mode 13.

Effect mode 14 indicates effect processing for changing a size of the 3D model. A degree to which the 3D model is to be resized can be designated, for example, by a defined parameter associated with effect mode 14.

For effect modes 1 to 14, the effect direction and the effect distance can be set, but a default effect direction and a default effect distance can be defined, as necessary.

For example, the past direction past can be defined as the default effect direction for effect modes 1 to 10.

Further, for example, the number of models number=1 can be defined as a default effect distance for effect mode 1.

In this case, when the effect direction and the effect distance for effect mode 1 are not set, the 3D model away by one or more models in the past direction from the reference 3D model, that is, the 3D model before the next 3D model in the past direction from the reference 3D model is set as the target model, and effect processing for effect mode 1 is performed.

Further, for example, a distance distance=5 [m] can be defined as the default effect distance for effect mode 4.

In this case, when the effect direction and the effect distance for effect mode 4 are not set, the 3D model away 5 m or more in the past direction from the reference 3D model is set as the target model and the effect processing for effect mode 4 is performed.

Further, for example, a time time=10 [sec] can be defined as the default effect distance for effect mode 5.

In this case, when the effect direction and the effect distance for effect mode 5 are not set, the 3D model away by 10 seconds or more in the past direction from the reference 3D model is set as the target model and the effect processing for effect mode 5 is performed.

Further, for example, the number of models number=3 can be defined as the default effect distance for effect mode 7.

In this case, when the effect direction and the effect distance for effect mode 7 are not set, the 3D model away by three or more models in the past direction from the reference 3D model, that is, the 3D model before a third 3D model in the past direction from the reference 3D model is set as the target model, and the effect processing for effect mode 7 is performed.

A plurality of effect modes can be set for the effect processing that is performed by the effect processing unit 32. For example, when effect modes 1 and 3 are set for effect processing, effect processing for making the 3D model transparent and reducing the number of textures is performed.

<3D Model>

Figure 13:
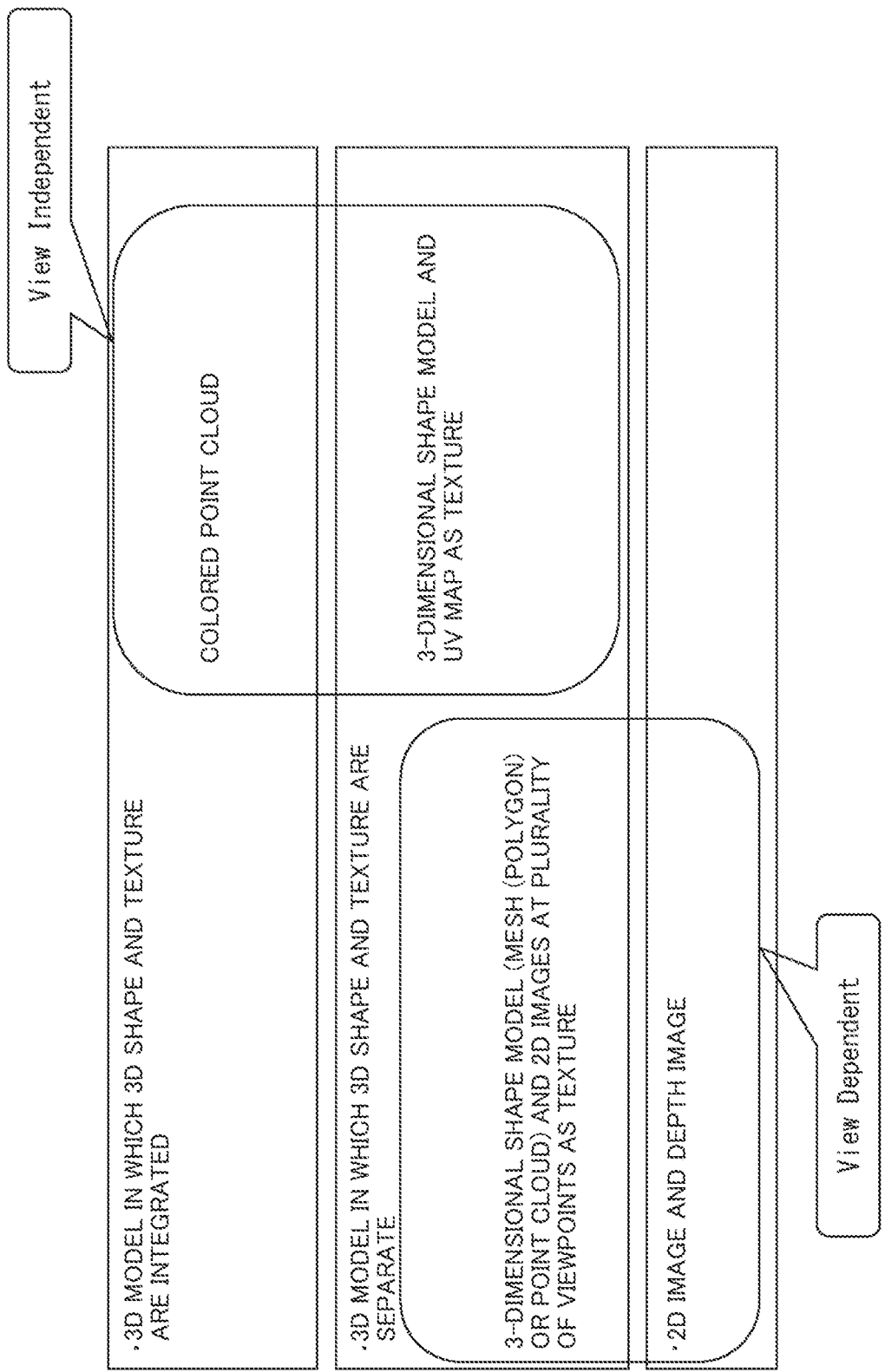
FIG. 13 is a diagram illustrating a 3D model that is generated by a 3D model generation unit 21.

FIG. 13 is a diagram illustrating a 3D model that is generated by the 3D model generation unit 21 in FIG. 2.

Examples of the 3D model generated by the 3D model generation unit 21 include a 3D model in which a 3D shape (three-dimensional shape) and a texture are integrated, a 3D model in which the 3D shape and the texture are separate, and a set of 2D images and depth images at a plurality of viewpoints.

Here, there is a colored point cloud as a 3D model in which a 3D shape and a texture are integrated. Examples of the 3D model in which the 3D shape and the texture are separate include a set of the 3-dimensional shape model (mesh (polygon) or point cloud) and the 2D images at the plurality of viewpoints serving as a texture, and a set of the 3-dimensional shape model and a UV map serving as a texture.

The colored point cloud or the set of the 3-dimensional shape model and the UV map serving as the texture is a VI model, and the set of the 3-dimensional shape model and the 2D images at a plurality of viewpoints serving as the texture or the set of 2D images and depth images at a plurality of viewpoints is a VD model.

For the 3D model in which the 3D shape and the texture are integrated, standardization of a coding scheme is scheduled in MPEG. For the 3D model in which the 3D shape and the texture are separate, a coding scheme is standardized as MPEG-4 AFX (Animation Framework eXtension). The set of the 2D images and the depth images at the plurality of viewpoints can be encoded by a coding scheme in which 2D images are targets, such as HEVC (High Efficiency Video Coding).

<Settings of Target Object>

Figure 14:
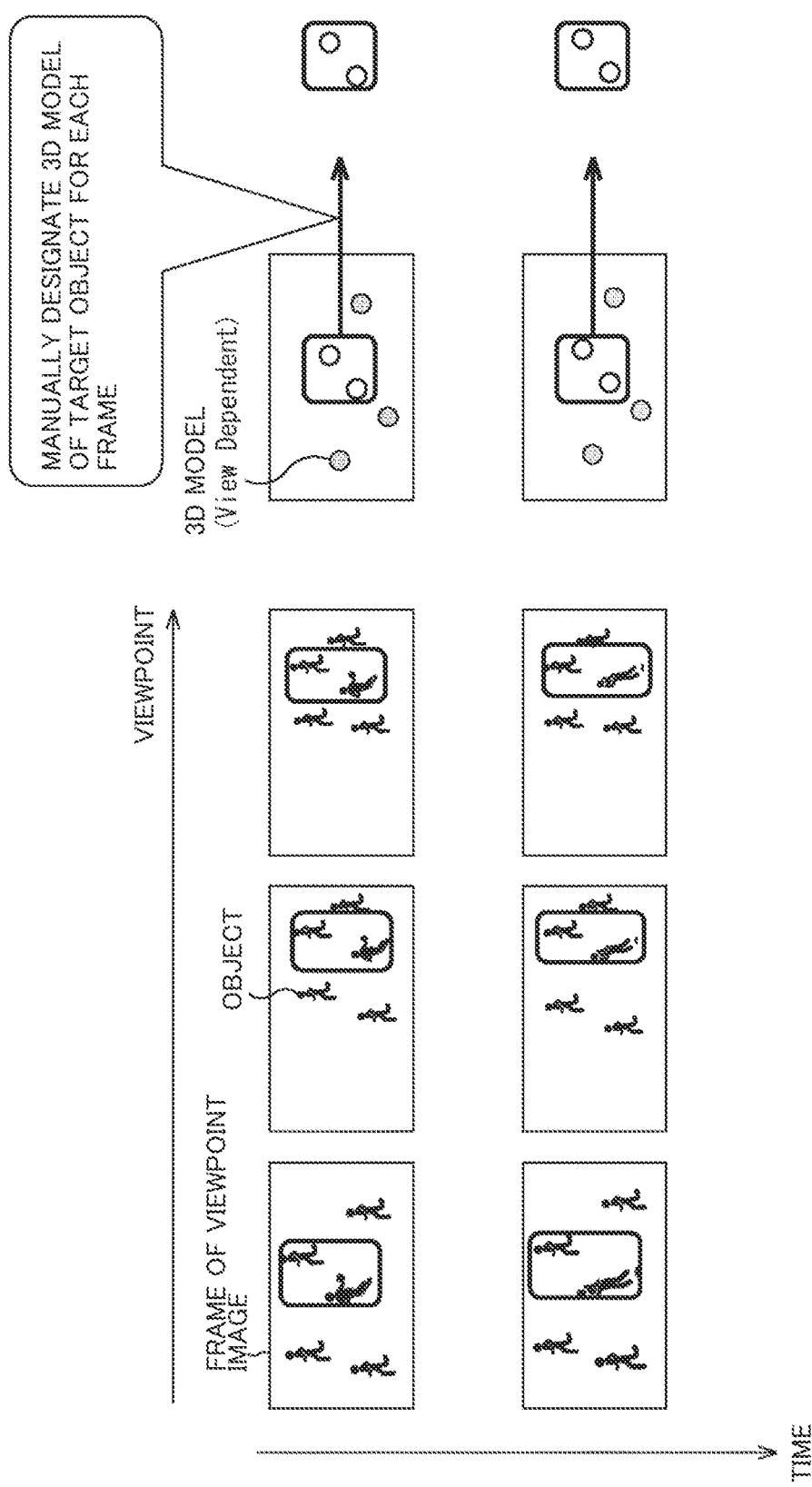
FIG. 14 is a diagram illustrating an example of a setting of a target object.

FIG. 14 is a diagram illustrating an example of a setting of the target object.

An example of a method of setting the target object includes a method of asking the user to designate a 3D model of the target object.

In FIG. 14, a vertical axis indicates time and a horizontal axis indicates a viewpoint. In FIG. 14, viewpoint images at a plurality of viewpoints are shown for each frame.

When the method of asking the user to designate the 3D model of the target object is adopted as a method of setting the target object, the 3D model of the object reflected in the frame is generated using the viewpoint images at the plurality of viewpoints for each frame (generation frame) of the viewpoint image. The 3D model may be either the VD model or the VI model. The user manually designates the 3D model of the target object (an object as the target object) for each frame.

As described above, in the method of asking the user to designate the 3D model of the target object, the user must manually designate the 3D model of the target object for each frame, which is troublesome and is burdensome for the user.

Therefore, the generation apparatus 12 generates the object designation UI information, and the display apparatus 13 displays the object designation UI according to the object designation UI information. The user can easily designate the target object using the object designation UI.

Figure 15:
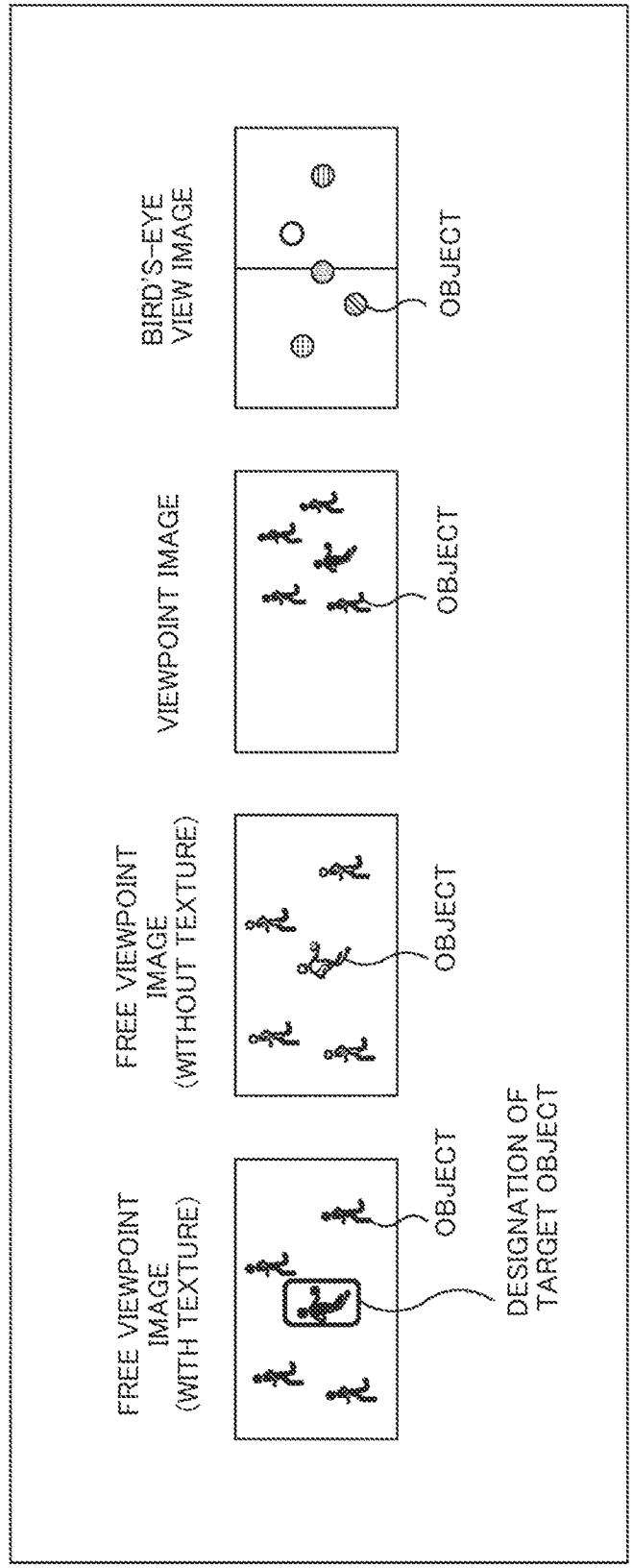
FIG. 15 is a diagram illustrating an example of an object designation UI that is displayed according to object designation UI information.

FIG. 15 is a diagram illustrating an example of the object designation UI displayed according to the object designation UI information.

It is possible to adopt, as the object designation UI, a free viewpoint image (still image or moving image) in which the object is reflected when the 3D model generated by the 3D model generation unit 21 is viewed from a predetermined viewpoint. As the free viewpoint image serving as the object designation UI, a free viewpoint image with a texture can be adopted or a free viewpoint image without a texture can be adopted. Regarding the free viewpoint image serving as the object designation UI, it is possible to change the viewpoint according to the operation of the user (with respect to the operation unit 36).

Further, it is possible to adopt the viewpoint image itself in which the object is reflected as the object designation UI. Further, it is possible to adopt a bird's-eye view image in which an object (a symbol indicating an object) is reflected, which is a bird's-eye view of a scene reflected in the viewpoint image, as the object designation UI.

In the display apparatus 13, the free viewpoint image with the texture, the free viewpoint image without the texture, the viewpoint image, and the bird's-eye view image serving as the object designation UI to be displayed can be selected according to, for example, the operation of the user.

By operating the operation unit 36, the user designates the target object with respect to the object designation UI from the objects displayed on the object designation UI. The object designation information setting unit 37 sets the target object designated by the user as a key object according to the operation of the user, and sets (generates) object designation information indicating the key object. The target object set as the key object does not need to be designated for each frame. A plurality of objects can be designated as target objects to be set as the key object. That is, a plurality of objects can be set as the key objects.

As described above, by the object designation UI being displayed, the user can easily designate a desired object as a target object serving as a key object by performing an operation with respect to the object designation UI.

Here, the target object designated by the user is set as the key object, but processing for analyzing the viewpoint image or the like can be performed and the key object can be set according to a result of the analyzing processing. For example, the viewpoint image in which the soccer match is reflected is subjected to analysis processing such that the player holding the soccer ball can be recognized and can be set as a key object.

Further, the user can designate a spatial range of the object serving as the target object, that is, a spatial range of the object that is set in the target object according to the positional relationship serving as the degree of object relevance with the key object, in addition to designating the key object, by performing an operation with respect to the object designation UI. In this case, the strobe range information setting unit 38 sets the strobe range information indicating the spatial range of the object set in the target object according to the operation of the user.

Figure 16:
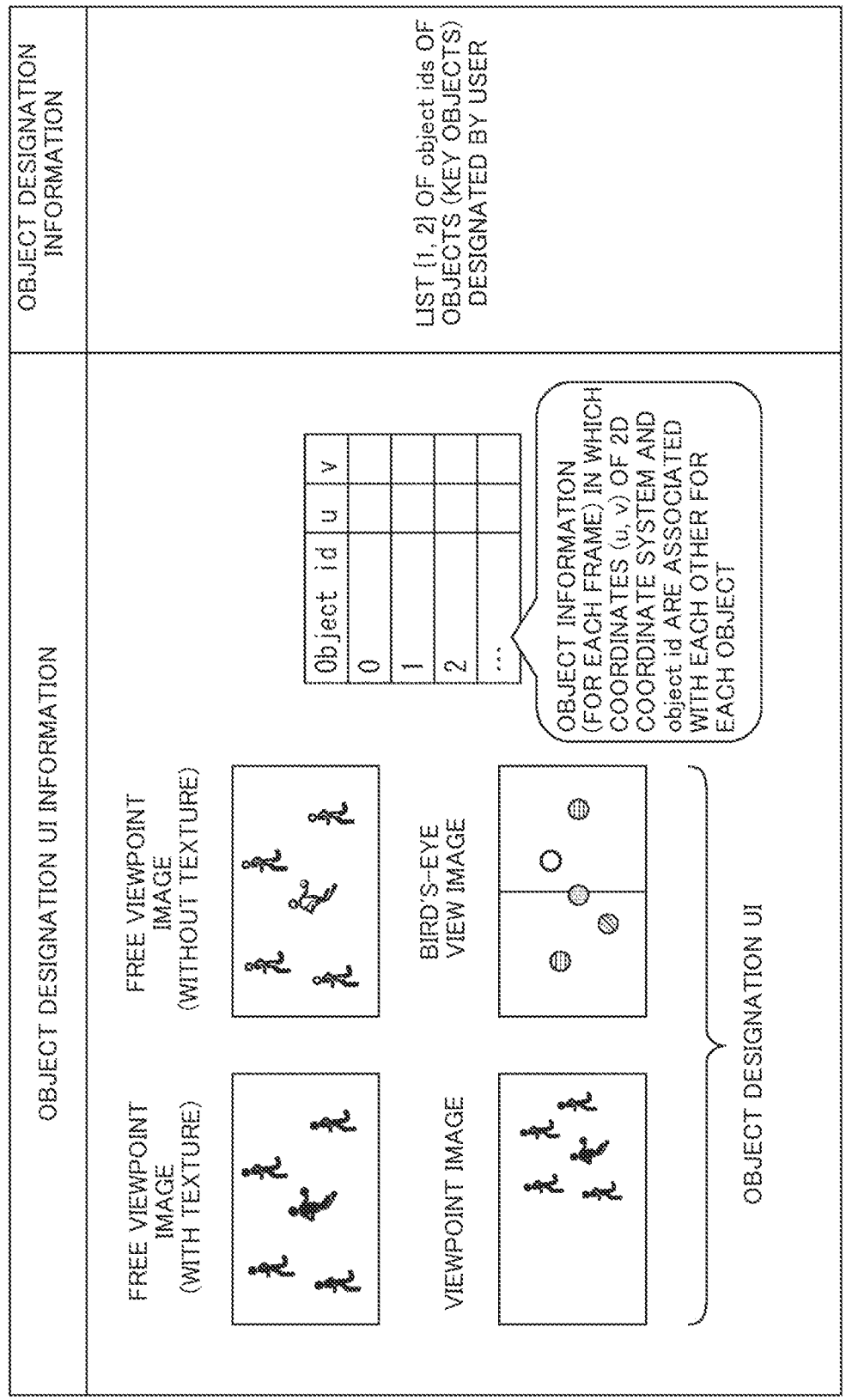
FIG. 16 illustrates the object designation UI information and the object designation information.

FIG. 16 illustrates the object designation UI information and the object designation information.

The object designation UI information generated by the object designation UI information generation unit 23 (FIG. 2) includes the object designation UI and the object information.

The object information is present in each frame of the free viewpoint image or the like serving as the object designation UI, and has a structure in which an object ID for specifying the object (subject) reflected in the frame is associated with, for example, coordinates (u, v) of a 2D coordinate system serving as position information of the object.

The object designation information setting unit 37 (FIG. 3) recognizes the object ID of the key object designated by the operation of the user with respect to the object designation UI from the object information, and sets a list of object IDs of the key object as the object designation information.

The strobe model generation unit 22 of the generation apparatus 12 (FIG. 2) refers to the object information generated by the object designation UI information generation unit 23 and specifies the key object indicated by the object ID serving as the object designation information.

<Strobe Range Information>

Figure 17:
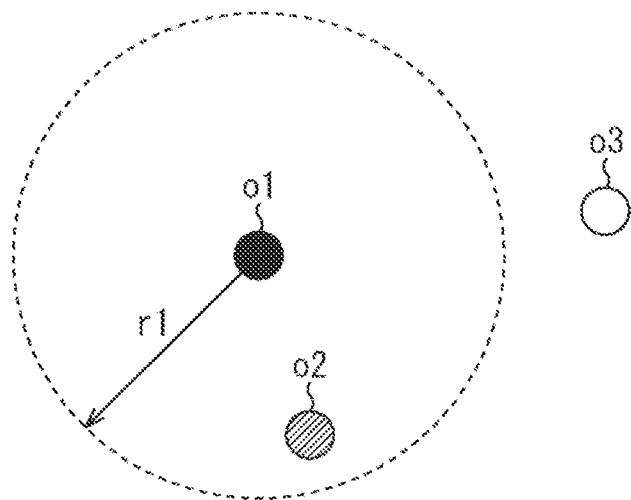
FIG. 17 is a diagram illustrating a first example of strobe range information.

FIG. 17 is a diagram illustrating a first example of the strobe range information.

As the strobe range information indicating the spatial range of the object serving as the target object (the object set as the target object), information indicating a range with reference to the key object or information indicating a range with reference to an object (non-key object) other than the key object can be adopted.

A radius of a circle (sphere) around centered on the key object, that is, a distance from the key object, for example, can be adopted as the information indicating the range with reference to the key object. A radius of a circle centered on the non-key object, that is, a distance from the non-key object, for example, can be adopted as the information indicating the range with reference to the non-key object.

When the distance from the key object is adopted as the strobe range information, the strobe range information is set only for the key object. When the distance from the non-key object is adopted as the strobe range information, the strobe range information is set for each non-key object. The distance from the non-key object as the strobe range information may differ or be the same for each non-key object.

FIG. 17 illustrates an example of a setting of the target object when the distance from the key object is adopted as the strobe range information.

FIG. 17 illustrates a bird's view of the three-dimensional space reflected in the viewpoint image.

In FIG. 17, there are three objects o1, o2, and o3, and the object o1 is set as a key object. Therefore, the objects o2 and o3 are non-key objects. In FIG. 17, a distance r1 from the key object is set in the strobe range information. The non-key object o2 is located at a distance shorter than the distance r1 with respect to the key object o1, and the non-key object o3 is located at a position larger than the distance r1 with respect to the key object o1.

In this case, in the strobe model generation unit 22 (FIG. 2), the key object o1 and the object o2 of which a distance from the key object o1 is within the distance r1 serving as the strobe range information among the objects o1 to o3 are set as target objects. The object o3 is not set as the target object because the distance from the key object o1 exceeds the distance r1 serving as the strobe range information.

The strobe range information setting unit 38 (FIG. 3) can set the strobe range information according to the key object (specified by the object ID) indicated by the object designation information, in addition to setting the strobe range information according to the operation of the user with respect to the operation unit 36. When the strobe range information setting unit 38 sets the strobe range information according to the key object, the strobe range information setting unit 38 can set a different distance for each key object in the strobe range information.

For example, when the viewpoint image is an image obtained by photographing a soccer match and a player and a soccer ball are set as key objects, different distances of the player and the soccer ball as the key objects can be set in strobe range information of the player and the soccer ball. For example, a predetermined distance that has been determined in advance can be set for the player, and a distance longer than the distance set for the player can be set for the soccer ball.

Figure 18:
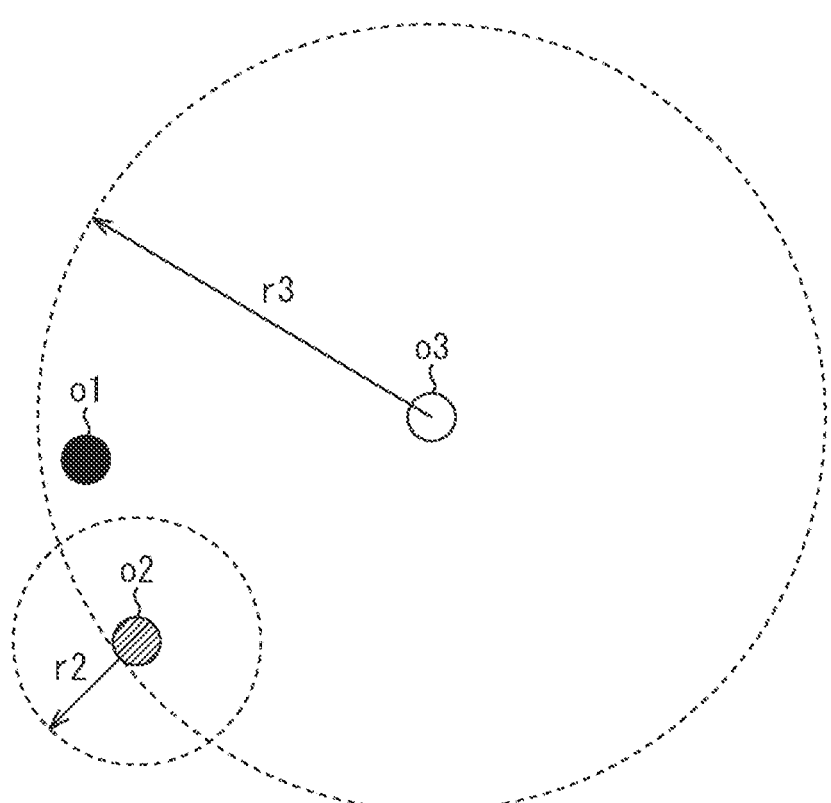
FIG. 18 is a diagram illustrating a second example of the strobe range information.

FIG. 18 is a diagram illustrating a second example of the strobe range information.

In FIG. 18, an example of a setting of the target object when a distance from the non-key object is adopted as the strobe range information is illustrated.

FIG. 18 illustrates a bird's view of the three-dimensional space reflected in the viewpoint image, as in FIG. 17.

Further, in FIG. 18, there are three objects o1 to o3, and the object o1 is set as the key object, as in FIG. 17. Therefore, the objects o2 and o3 are non-key objects, as in FIG. 17. Further, in FIG. 18, the non-key object o2 is located at a smaller distance as compared with the non-key object o3 with respect to the key object o1, and the non-key object o3 is located at a larger distance as compared with the non-key object o2 with respect to the key object o1. This point is the same as in FIG. 17.

In FIG. 18, distances r2 and r3 from the non-key objects o2 and o3 are set in the strobe range information. The distance r3 is larger than the distance r2. In this case, in the strobe model generation unit 22 (FIG. 2), the key object o1 and the object o3 of which a distance to the key object o1 is within the distance r3 serving as the strobe range information among the objects o1 to o3 are set as the target objects. The object o2 is not set as the target object because a distance to the key object o1 exceeds the distance r2 serving as the strobe range information of the non-key object o2.

As described above, when the distance from the non-key object is adopted as the strobe range information, the non-key object o3 of which a distance from the key object o1 is large, rather than the non-key object o2 of which a distance from the key object o1 is small, can be set as the target object depending on a way of setting the distance from the non-key object serving as the strobe range information.

For example, in a case in which the viewpoint image is an image obtained by photographing a soccer match, when a key object is a field player holding a soccer ball, a distance serving as strobe range information of a goalkeeper of an opponent team serving as a non-key object can be set as a distance (predicted to be) longer than a distance to the field player holding the soccer ball. In this case, the field player holding the soccer ball serving as the key object and the goalkeeper of the opponent team serving as the non-key object are the target objects, and at least a 3D strobe image in which (a 3D model of) the field player holding the soccer ball and (a 3D model of) the goalkeeper of the opponent team serving as the non-key object are reflected can be generated.

<Strobe Time Information>

Figure 19:
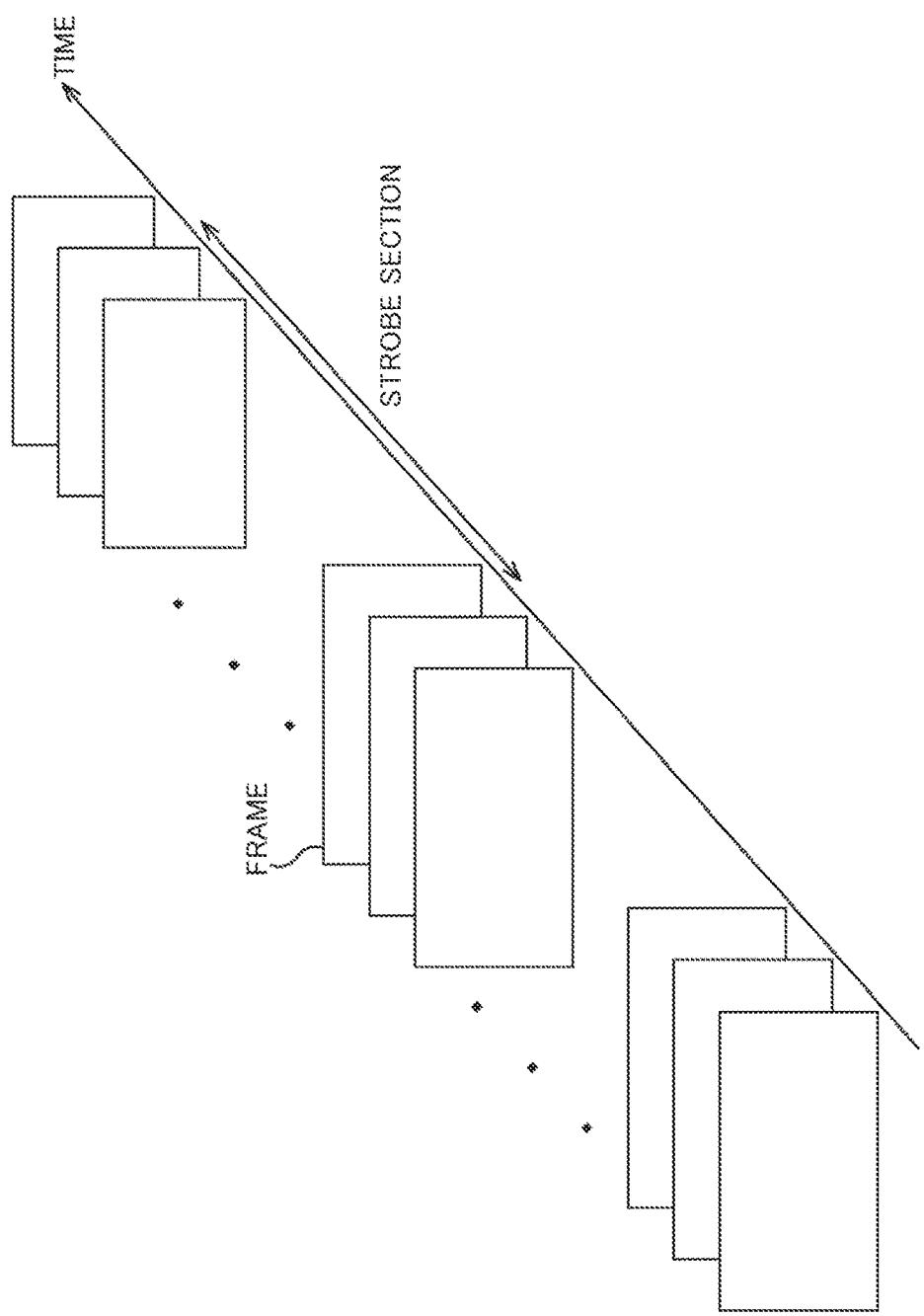
FIG. 19 is a diagram illustrating strobe time information.

FIG. 19 is a diagram illustrating the strobe time information.

The strobe time information indicates the strobe section that is a section of a frame for which the strobe model is generated. The user, for example, can designate a first frame and a last frame in the strobe section or input time codes of the first frame and the last frame in the strobe section to designate the strobe section.

<Setting of Target Object According to Positional Relationship (Distance) Between Key Object and Non-Key Object as Degree of Object Relevance>

Figure 20:
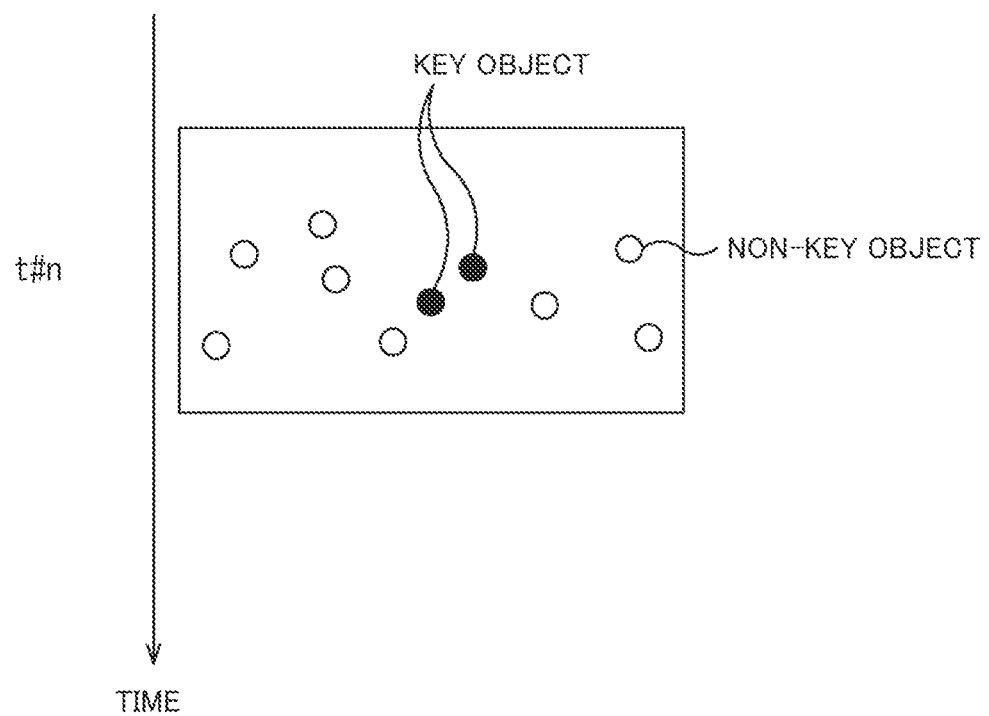
FIG. 20 is a diagram illustrating a first example of a setting of a target object according to a positional relationship between a key object and a non-key object as a degree of object relevance.

FIG. 20 is a diagram illustrating a first example of a setting of a target object according to the positional relationship between the key object and the non-key object as a degree of object relevance.

In FIG. 20, the user designates a certain object (two objects in FIG. 20) among objects reflected in a generation frame t#n as (a target object serving as) the key object.

In the first example of the setting of the target object, the strobe model generation unit 22 sets only the key object as the target object.

Figure 21:
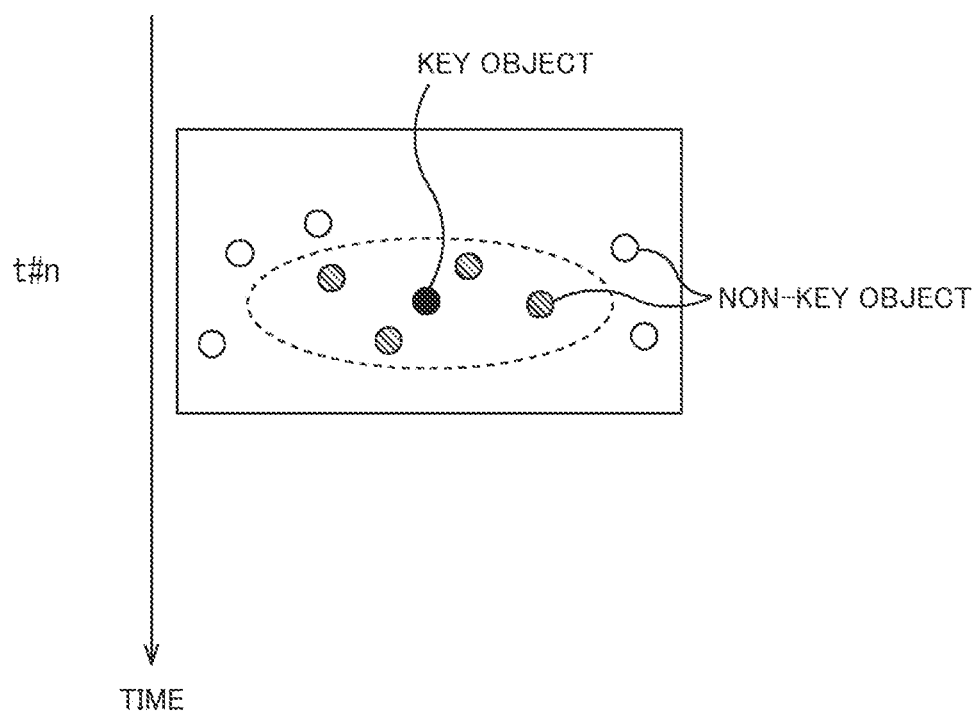
FIG. 21 is a diagram illustrating a second example of the setting of the target object according to the positional relationship between the key object and the non-key object as the degree of object relevance.

FIG. 21 is a diagram illustrating a second example of the setting of the target object according to the positional relationship between the key object and the non-key object as the degree of object relevance.

In FIG. 21, the user designates a certain object (one object in FIG. 21) among the objects reflected in the frame t#n as the key object.

In the second example of the setting of the target object, the strobe model generation unit 22 sets the key object and a non-key object (indicated by a shaded circle in FIG. 21) of which the distance from the key object is within a predetermined distance serving as the strobe range information among the non-key objects reflected in the generation frame t#n in which the key object has been designated, as the target objects.

Figure 22:
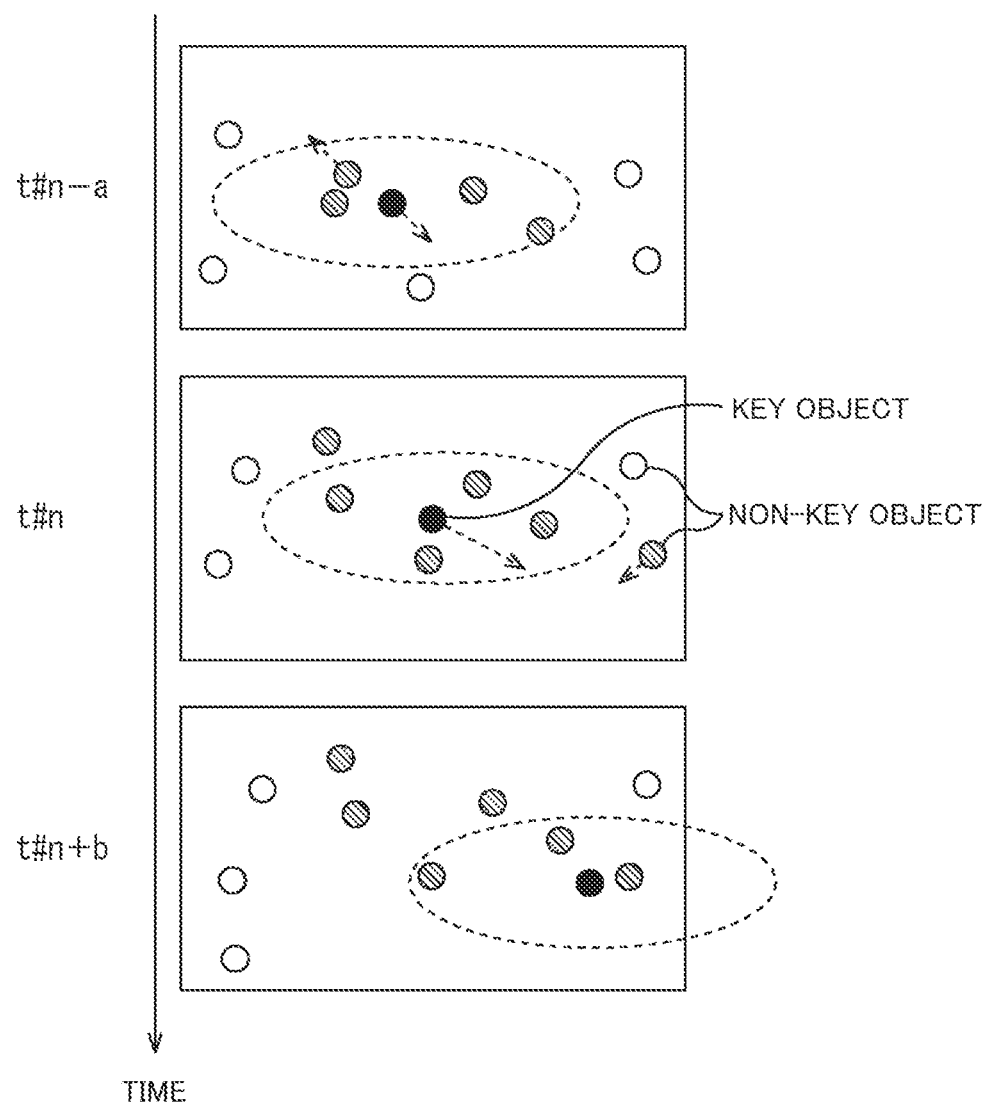
FIG. 22 is a diagram illustrating a third example of the setting of the target object according to the positional relationship between the key object and the non-key object as the degree of object relevance.

FIG. 22 is a diagram illustrating a third example of the setting of the target object according to the positional relationship between the key object and the non-key object as the degree of object relevance.

In FIG. 22, the user designates a certain object (one object in FIG. 22) among the objects reflected in the generation frame t#n as the key object.

In a third example of the setting of the target object, the strobe model generation unit 22 sets the key object and a non-key object (indicated by a shaded circle in FIG. 22) of which the distance from the key object is within the predetermined distance serving as the strobe range information among the non-key objects reflected in the generation frame t#n in which the key object has been designated, as the target objects.

Further, the strobe model generation unit 22 sets, as the target object, a non-key object reflected in a generation frame t#n−a before one frame from the generation frame t#n in which the key object has been designated, and a non-key object (indicated by a shaded circle in FIG. 22) of which a distance from the key object is within the predetermined distance serving as strobe range information among non-key objects reflected in a generation frame t#n+b after one frame from the generation frame t#.

As described above, in the third example of the setting of the target object, a non-key object of which a distance to the key object is within a predetermined distance in the generation frame t#n in which the key object as one generation frame is designated, and a non-key object of which a distance to the key object is within the predetermined distance in the generation frame t#n−a before one frame from the generation frame t#n or the generation frame t#n+b after one frame as another generation frame are set as the target objects.

In this case, even when the object is a non-key object of which the distance to the key object is not within the predetermined distance in the generation frame t#n in which the key object has been designated, the distance to the key object may be within the predetermined distance and set as the target object in other generation frames when the non-key object or the key object moves as indicated by a dotted arrow in FIG. 22.

In the third example of the setting of the target object, for example, the non-key object of which the distance from the key object is within the predetermined distance serving as the strobe range information in a generation frame before or after two or more frames from the generation frame t#n in which the key object has been designated can also be set as the target object.

Figure 23:
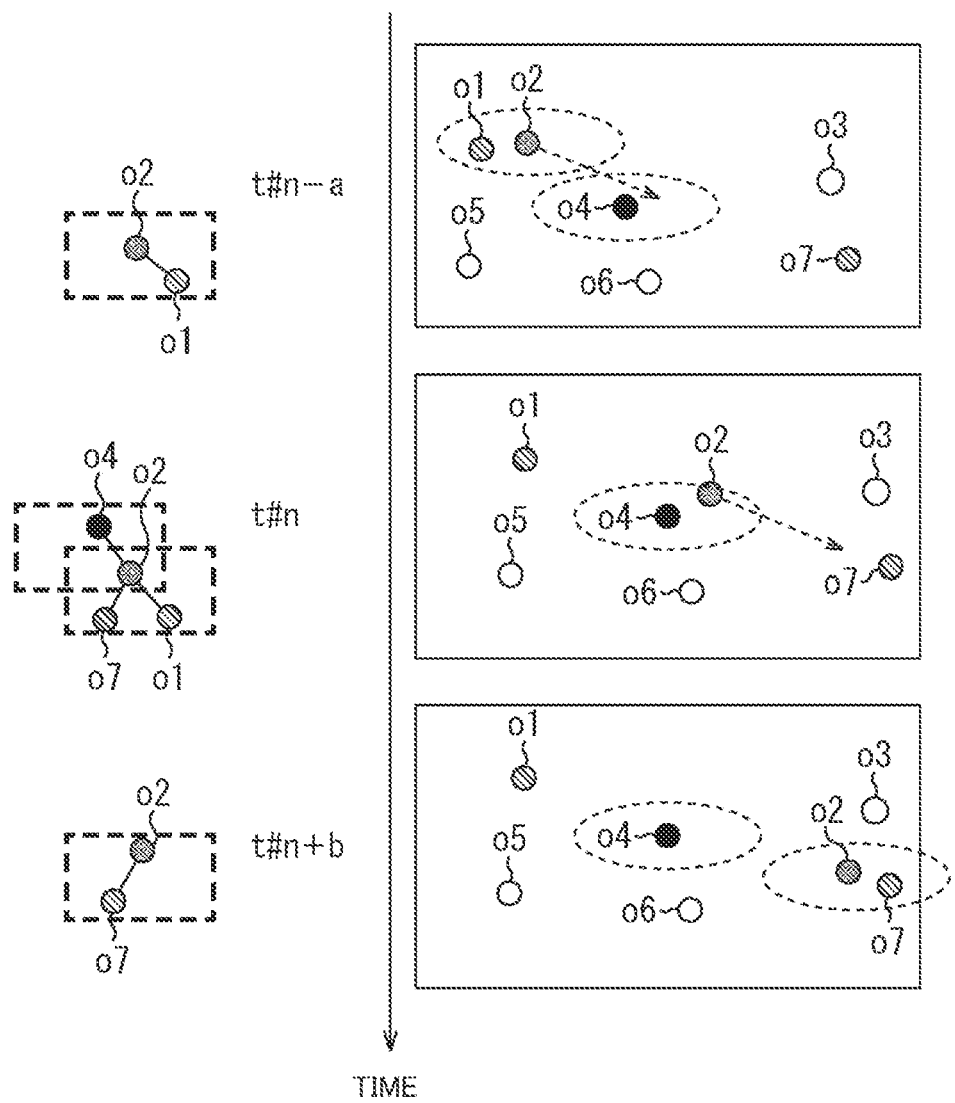
FIG. 23 is a diagram illustrating a fourth example of the setting of the target object according to the positional relationship between the key object and the non-key object as the degree of object relevance.

FIG. 23 is a diagram illustrating a fourth example of the setting of the target object according to the positional relationship between the key object and the non-key object as the degree of object relevance.

In FIG. 23, the user designates an object o4 among objects o1 to o7 reflected in the generation frame t#n as the key object.

In the fourth example of the setting of the target object, the strobe model generation unit 22 sets, as the target object, the non-key object o2 of which a distance from the key object o4 is within the predetermined distance serving as the strobe range information among the key object o4 and the non-key objects o1 to o3 and o5 to o7 reflected in the generation frame t#n in which the key object o4 has been designated.

Further, the strobe model generation unit 22 sets the object o2 set as the target object among the non-key objects o1 to o3 and o5 to o7 reflected in the generation frame t#n in which the key object o4 has been designated, as a quasi-key object of the key object. The strobe model generation unit 22 sets, as the target object, the non-key object of which a distance from the quasi-key object o2 is within the predetermined distance serving as the strobe range information among the non-key objects o1 to o3 and o5 to o7 reflected in the generation frame t#n−a before one frame from the generation frame t#n in which the key object has been designated, and the non-key objects o1 to o3 and o5 to o7 reflected in the generation frame t#n+b after one frame.

In FIG. 23, the quasi-key object o2 is moving as indicated by a dotted arrow in FIG. 23. Therefore, in FIG. 23, in the generation frame t#n−a, there is an object o1 as a non-key object of which a distance from the quasi-key object o2 is within the predetermined distance serving as the strobe range information. Further, in the generation frame t#n+b, there is an object o7 as a non-key object of which a distance from the quasi-key object o2 is within the predetermined distance serving as the strobe range information.

As a result, in the fourth example of the setting of the target object, the non-key object o1 reflected in the generation frame t#n−a and the non-key object o7 reflected in the generation frame t#n+b in addition to the key object o4 and the quasi-key object o2 are set as the target objects.

In the fourth example of the setting of the target object, the key object o4 is set as a root node, and the non-key object o2 within the predetermined distance serving as the strobe range information from the key object o4 in the generation frame t#n in which the key object o4 has been designated becomes a node belonging to the root node. Further, in the generation frame t#n−a before one frame from the generation frame t#n in which the key object o4 has been designated and the generation frame t#n+b after one frame, the non-key objects o1 and o7 within the predetermined distance serving as the strobe range information from the non-key object o2 corresponding to the node belonging to the root node become nodes belonging to a node corresponding to the non-key object o2. The objects o1, o2, o4, and o7 corresponding to respective nodes of a tree structure including the above nodes are set as the target objects.

In the fourth example of the setting of the target object, it is possible to increase the number of repetitive nodes for a generation frame before or after two or more frames from the generation frame t#n in which the key object has been designated. That is, it is possible to repeatedly perform setting the objects o1 and o7 as quasi-key objects and setting, as the target object, the non-key object of which distances from the quasi-key objects o2 and o7 are within the predetermined distance serving as the strobe range information among the non-key objects reflected in the generation frame t#n−a before two frames from the generation frame t#n in which the key object has been designated and the generation frame after two frames. Further, the target object can be set by combining the third example (FIG. 22) and the fourth example (FIG. 23).

<Camera Work>

FIG. 24 is a diagram illustrating a first example of the camera work that is set by the camera work setting unit 35 in FIG. 3.

It is possible to set the photographing position, photographing attitude, and camera parameters of the virtual camera for each time as the camera work. For example, an image obtained by photographing the strobe model with the virtual camera at one time is one frame of the 3D strobe image.

The photographing position, photographing attitude, and camera parameters of the virtual camera for each time can be set according to the operation of the user or can be set automatically according to, for example, a distribution of the 3D models of the target object disposed in the strobe model.

The photographing attitude and the photographing position can be included in the camera parameters as some of the camera parameters.

Figure 25:
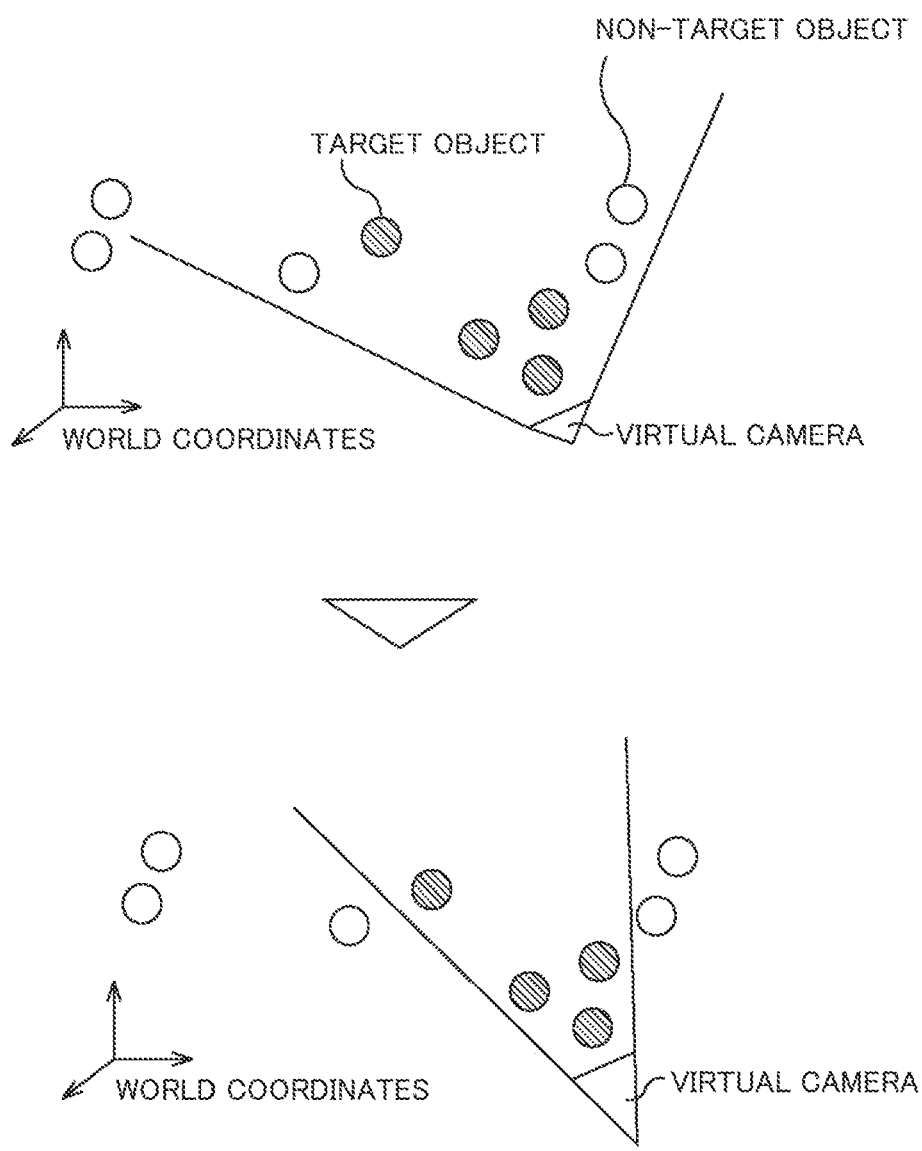
FIG. 25 is a diagram illustrating an example of a setting of a parameter regarding an angle of view (zoom magnification) among camera parameters serving as camera work.

FIG. 25 is a diagram illustrating an example of a setting of a parameter regarding the angle of view (zoom magnification) among the camera parameters serving as camera work.

As a parameter (focal length (fx, fy)) regarding the angle of view of the virtual camera, it is possible to set a camera parameter in which only the target object falls within the angle of view as much as possible, that is, a parameter in which an object that is not the target object (hereinafter referred to as a non-target object) does not fall within the angle of view as much as possible, as illustrated in FIG. 25.

The parameter regarding the angle of view can be set according to the operation of the user, and can also be set automatically according to the distribution of the 3D models of the target object disposed in the strobe model.

Figure 26:
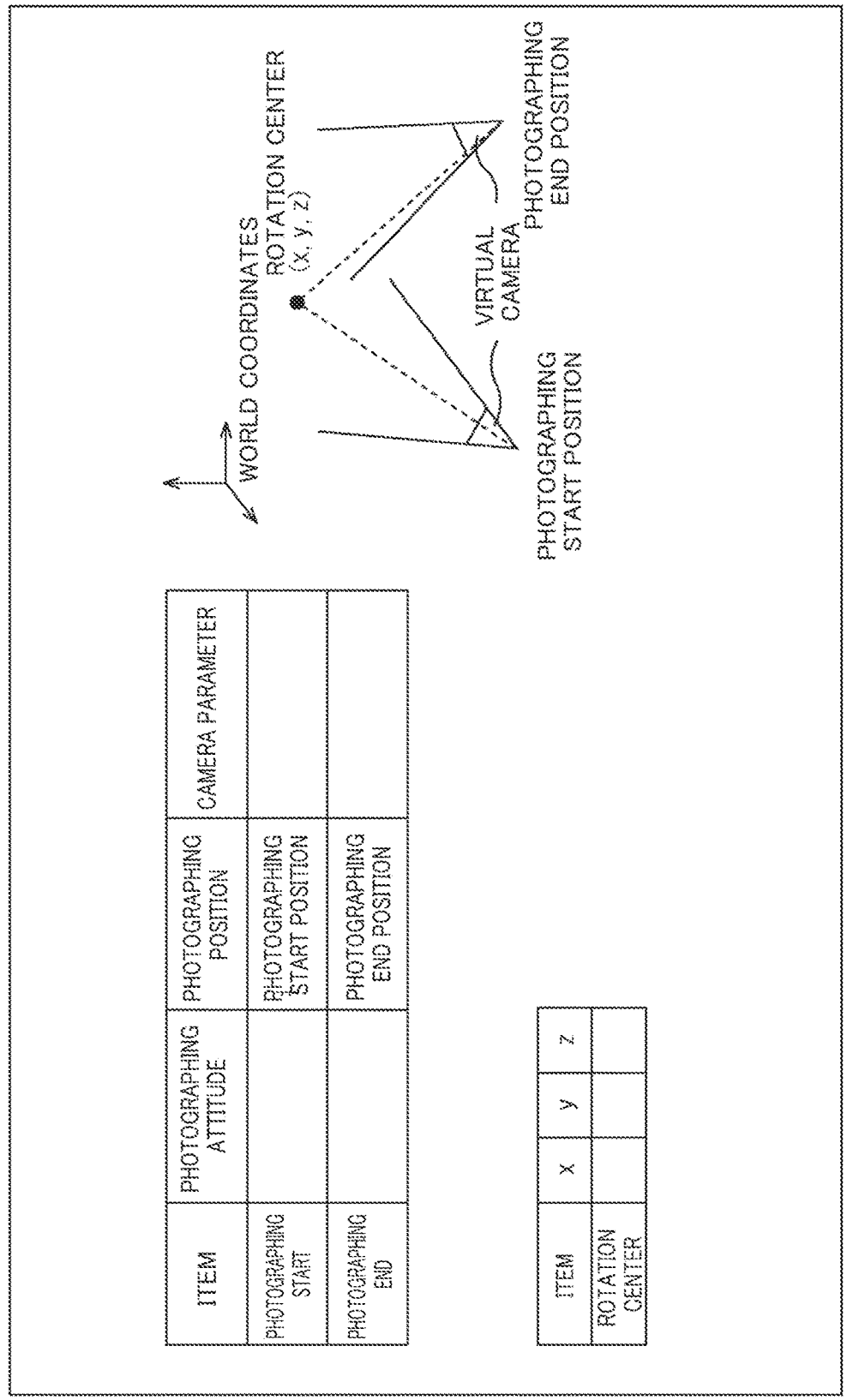
FIG. 26 is a diagram illustrating a second example of the camera work that is set by the camera work setting unit 35.

FIG. 26 is a diagram illustrating a second example of the camera work that is set by the camera work setting unit 35 in FIG. 3.

A photographing position of the virtual camera when the photographing of the strobe model is started (hereinafter also referred to as a photographing start position), a photographing position of the virtual camera when the photographing of the strobe model is ended (hereinafter referred to as a photographing end position), a photographing attitude of the virtual camera at each of the photographing end position and the photographing end position, and the camera parameters can be set as the camera work. Further, it is possible to set a center of rotation when the virtual camera is moved from the photographing start position to the photographing end position as the camera work. The center of rotation when the virtual camera is moved from the photographing start position to the photographing end position can be represented by coordinates of the xyz coordinate system serving as a world coordinate system.

The photographing start position, the photographing end position, the photographing attitude of virtual camera at each of the photographing end position and the photographing end position, and the camera parameters can be set according to the operation of the user and can also be performed automatically according to the distribution of the 3D models of the target object disposed in the strobe model, for example.

Similarly, the center of rotation can be set according to the operation of the user and can also be performed automatically according to the distribution of the 3D models of the target object disposed in the strobe model, for example. When the center of rotation is set according to the distribution of the 3D models of the target object disposed in the strobe model, a position of a center of gravity of the 3D model disposed in the strobe model, for example, can be set as the center of rotation.

Figure 27:
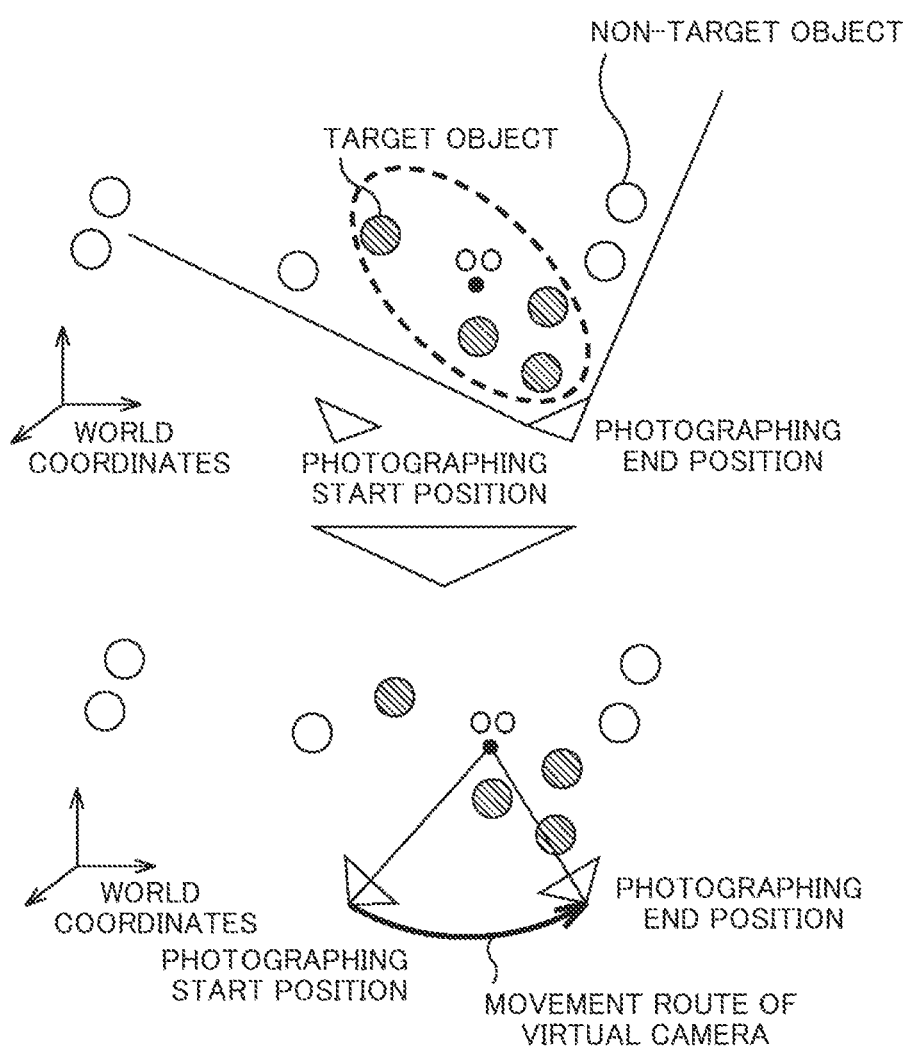
FIG. 27 is a diagram illustrating an example of movement of a virtual camera when the second example of the camera work is adopted.

FIG. 27 is a diagram illustrating an example of movement of the virtual camera when the second example of the camera work is adopted.

In FIG. 27, a position OO of a center of gravity of the target object is set as the center of rotation serving as the camera work. A route for movement from the photographing start position to the photographing end position on a circumference of a circle centered on the center of rotation OO can be adopted as a movement route for movement of the virtual camera.

When the second example of the camera work is adopted, the photographing position is interpolated on the movement route from the photographing start position to the photographing end position using the photographing start position and the photographing end position at the time of photographing of the strobe model with the virtual camera. Further, the photographing attitude of each photographing position is interpolated using the photographing attitudes of the photographing start position and the photographing end position, and the camera parameters of each photographing position are interpolated using the camera parameters at the photographing start position and the photographing end position. At each photographing position, the strobe model is photographed with each camera parameter using a virtual camera with each photographing attitude.

As described above, by setting the camera work such as the angle of view and the photographing position of the virtual camera, it is possible to effectively show the 3D strobe image to the user. That is, the user can view a temporal change in the target object from various viewpoints with an easy-to-view object size.

<Amount of Data of Strobe Model>

Figure 28:
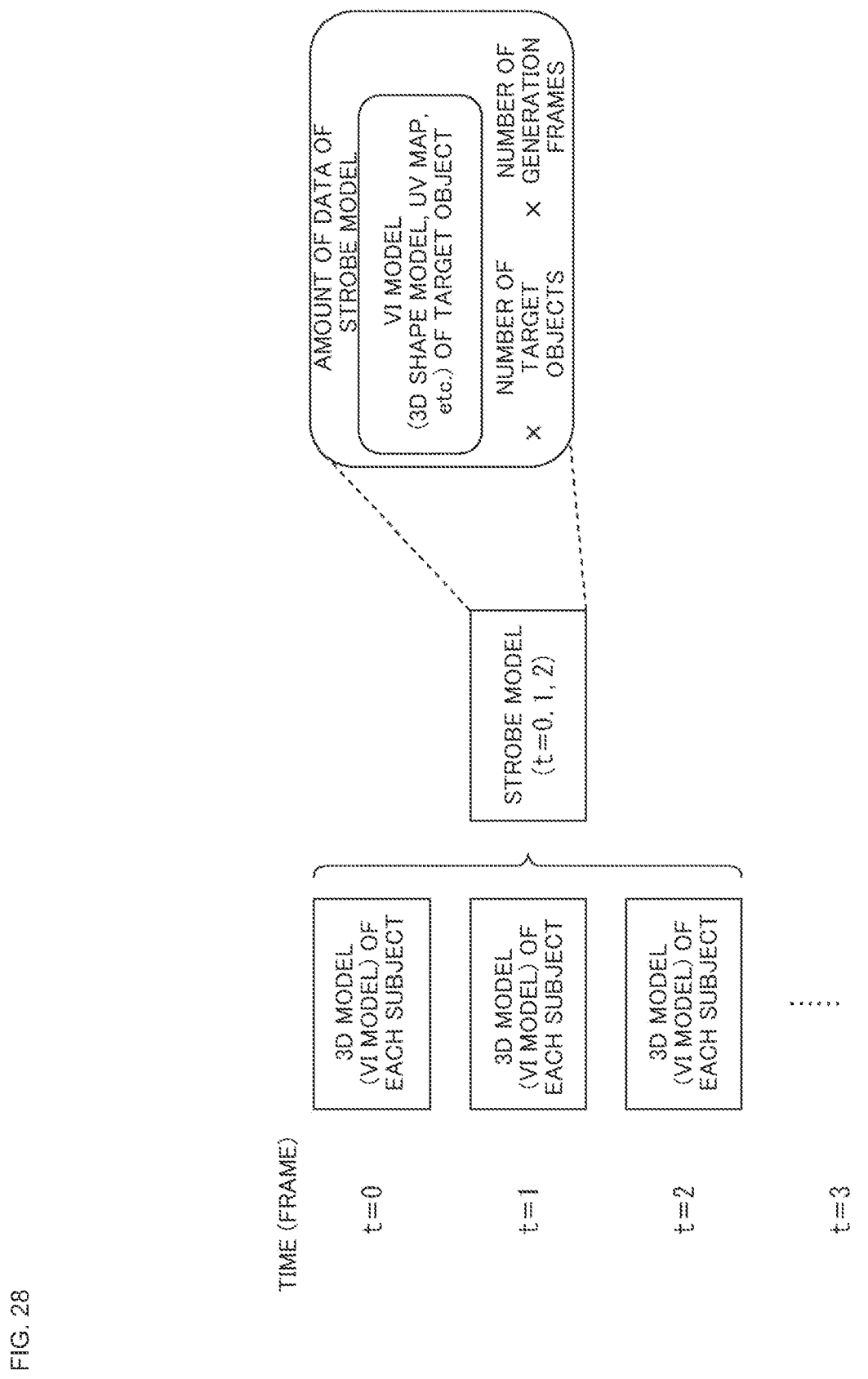
FIG. 28 is a diagram illustrating a first example of an amount of data of a strobe model.

FIG. 28 is a diagram illustrating a first example of the amount of data of the strobe model that is transmitted from the generation apparatus 12 to the display apparatus 13.

For example, when a set of a 3-dimensional shape model and a UV map or a VI model such as a colored point cloud is adopted as the 3D model, the strobe model has a configuration in which VI models corresponding to the number of target objects are disposed by the number of generation frames. Therefore, the amount of data in the strobe model corresponds to the number of generation frames of the amount of data in the VI model corresponding to the number of target objects. In FIG. 28, the generation frames are three frames at time t=0, 1, and 2.

Figure 29:
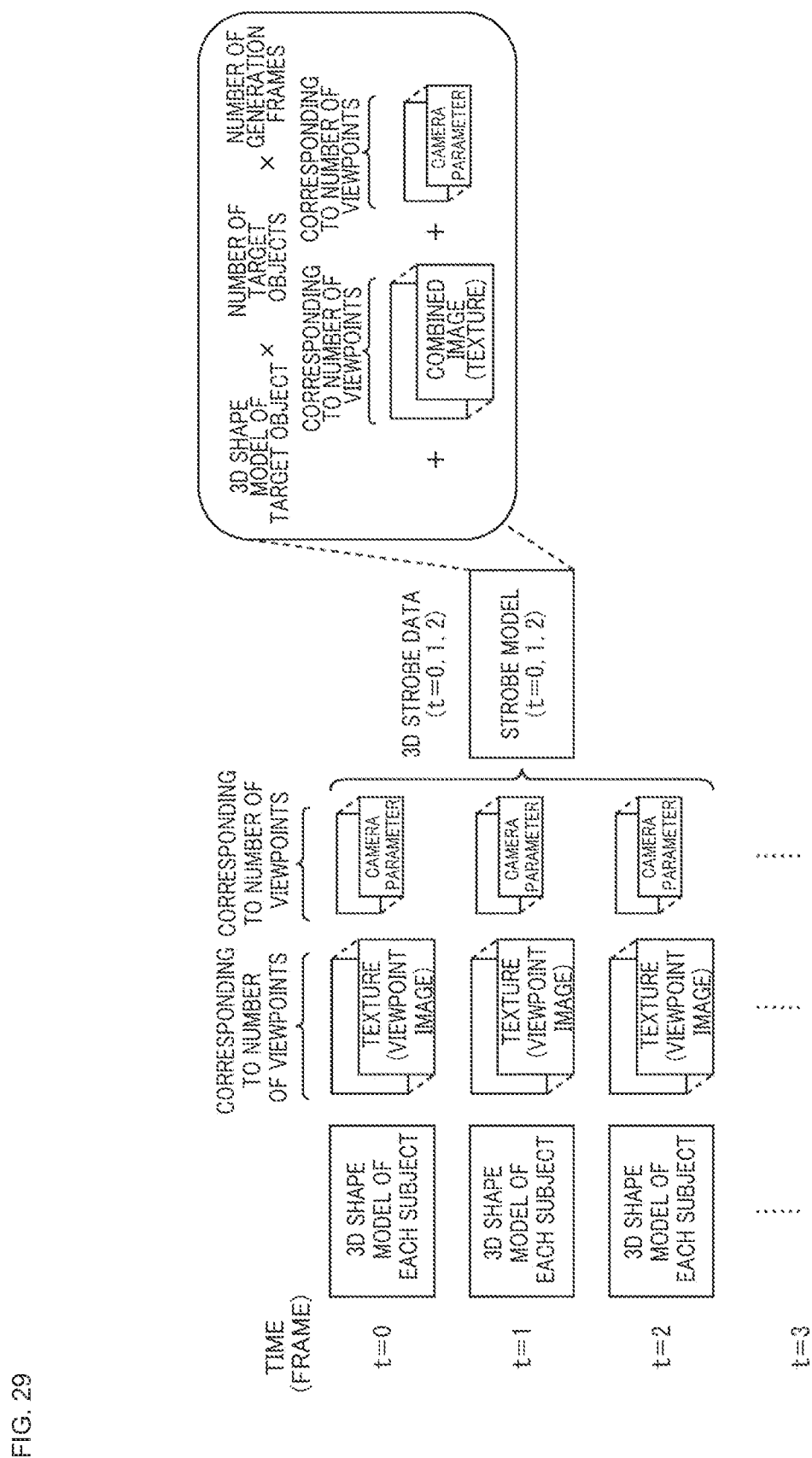
FIG. 29 is a diagram illustrating a second example of the amount of data of a strobe model.

FIG. 29 is a diagram illustrating a second example of the amount of data of the strobe model.

For example, when a VD model such as a set of a 3-dimensional shape model and a viewpoint image at each viewpoint serving as a texture used for texture mapping is adopted as the 3D model, the strobe model has a configuration in which the 3D shape models corresponding to the number of target objects subjected to texture mapping are disposed by the number of generation frames.

In this case, an amount of data in the 3D shape model of the strobe model corresponds to the number of generation frames of an amount of data in the 3D shape model corresponding to the number of target objects. In FIG. 29, the generation frames are three frames at time t=0, 1, and 2.

Here, when texture mapping is performed on the 3D shape model of each target object reflected in each generation frame, the generation frame of the viewpoint image at each viewpoint, that is, a frame (generation frame) of a viewpoint image corresponding to number of viewpoints×number of the generation frames is required as the texture. However, for the strobe model, when the strobe model has the texture of the target object on which the 3D model is disposed, texture mapping can be performed.

Therefore, here, for example, the texture mapping of the target object in which the 3D model is disposed in the strobe model is performed using a combined image obtained by combining (a plurality of) generation frames (that are used of the strobe model) so that the front side is preferentially reflected, in consideration of the depth of the target object reflected in the generation frame. Such a combined image is generated for each viewpoint. Further, in the texture mapping of the strobe model using the combined image for each viewpoint, the camera parameters (photographing position, focal length, and the like) for each viewpoint when the viewpoint image that is a source of the combined image is captured are required.

Therefore, when the texture mapping of the strobe model is performed using the combined image, the amount of data of the strobe model is an amount of data obtained by adding the amount of data of the combined image corresponding to the number of viewpoints and the amount of data of the camera parameters corresponding to the number of viewpoints to the number of generation frames of the amount of data of the 3D shape model corresponding to the number of target objects.

When the set of the 2D images and the depth images at the plurality of viewpoints is adopted as the VD model, the 2D images and the depth images at the plurality of viewpoints can be handled as the combined image, like the viewpoint image at each viewpoint serving as the texture described above.

Figure 30:
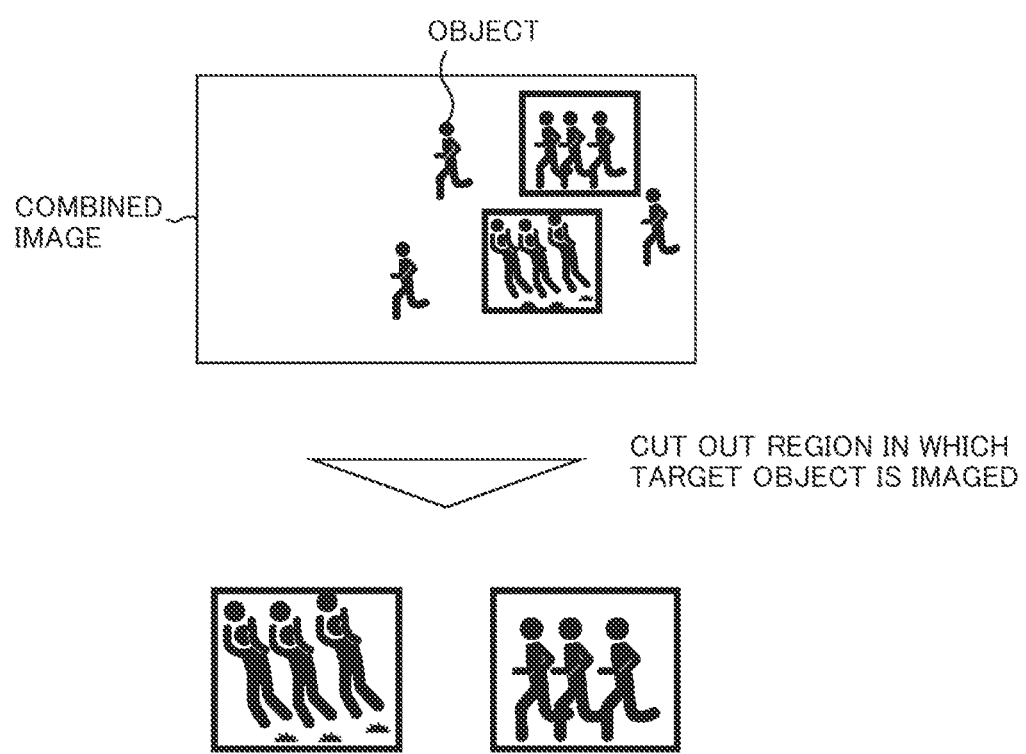
FIG. 30 is a diagram illustrating transmission of a combined image constituting a strobe model from the generation apparatus 12 to the display apparatus 13.

FIG. 30 is a diagram illustrating transmission of the combined image constituting the strobe model from the generation apparatus 12 to the display apparatus 13.

Regarding the combined image, a region of a part including the target object can be cut out from the combined image and the region of the part can be transmitted instead of the entire combined image, in addition to the entire combined image being transmitted from the generation apparatus 12 to the display apparatus 13.

As described above, when the region of the part of the combined image is transmitted, it is possible to curb the amount of data of the strobe model as compared with a case in which the entire combined image is transmitted.

<Another Embodiment of Image Processing System to which the Present Technology is Applied>

Figure 31:
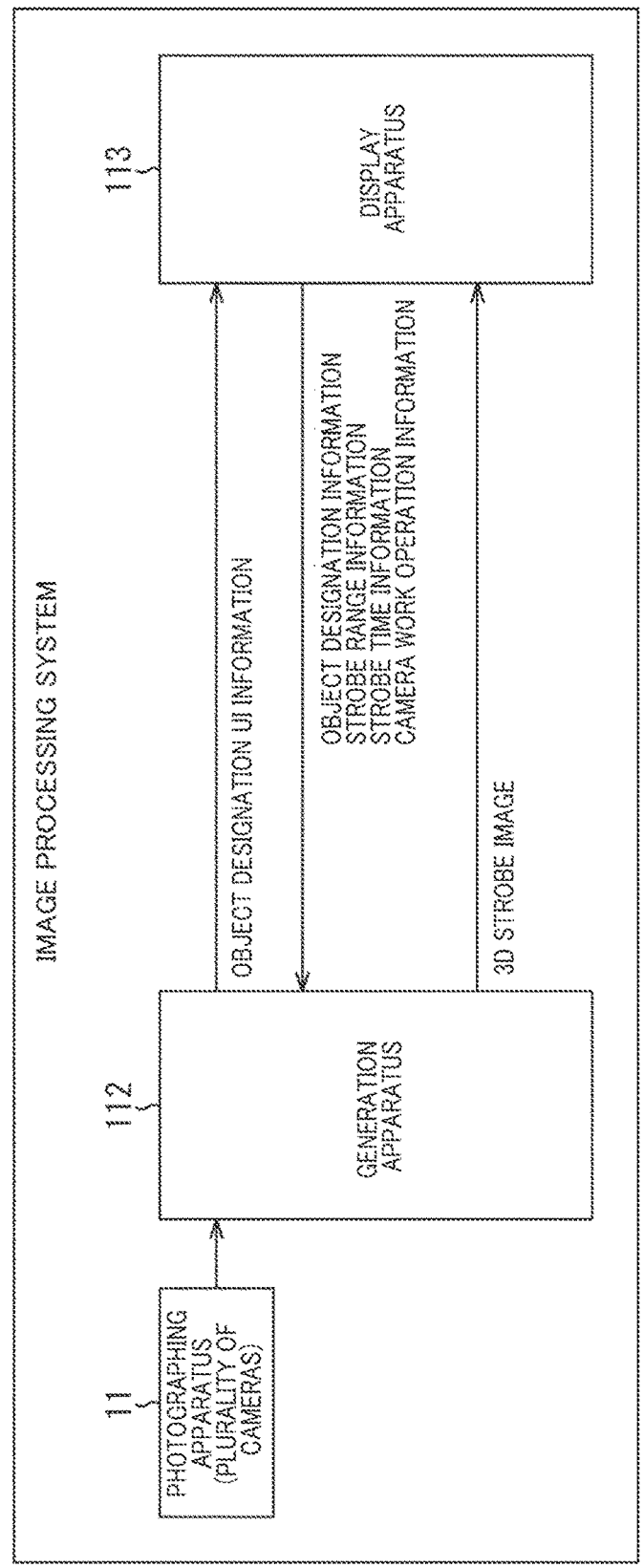
FIG. 31 is a block diagram illustrating a configuration example of another embodiment of the image processing system to which the present technology is applied.

FIG. 31 is a block diagram illustrating a configuration example of another embodiment of the image processing system to which the present technology is applied.

In FIG. 31, parts corresponding to those in FIG. 1 are denoted by the same reference signs, and description thereof will be hereinafter appropriately omitted.

In FIG. 31, the image processing system includes a photographing apparatus 11, a generation apparatus 112, and a display apparatus 113.

Therefore, the image processing system in FIG. 31 is the same as that in FIG. 1 in that the image processing system has the photographing apparatus 11. However, the image processing system in FIG. 31 differs from that in FIG. 1 in that the generation apparatus 112 and the display apparatus 113 are provided in place of the generation apparatus 12 and the display apparatus 13.

The generation apparatus 112 generates the object designation UI information and transmits the object designation UI information to the display apparatus 13 like the generation apparatus 12. Further, the generation apparatus 112 generates a strobe model according to the object designation information, the strobe range information, and the strobe time information transmitted from the display apparatus 113 like the generation apparatus 12.

Further, the generation apparatus 112 generates a 3D strobe image obtained by photographing the strobe model with a virtual camera according to a camera work set according to camera work operation information transmitted from the display apparatus 113, and transmits the 3D strobe image to the display apparatus 113. The camera work operation information is information indicating an operation performed by the user with respect to the camera work.

The display apparatus 113 displays the object designation UI according to the object designation UI information transmitted from the generation apparatus 112 like the display apparatus 13. Further, the display apparatus 113 sets the object designation information, the strobe range information, and the strobe time information according to the operation of the user with respect to the object designation UI or the like, and transmits the information to the generation apparatus 112 like the display apparatus 13.

Further, the display apparatus 113 transmits the camera work operation information to the generation apparatus 112 according to the operation of the user. Further, the display apparatus 113 displays the 3D strobe image transmitted from the generation apparatus 112.

<Configuration Example of Generation Apparatus 112>

Figure 32:
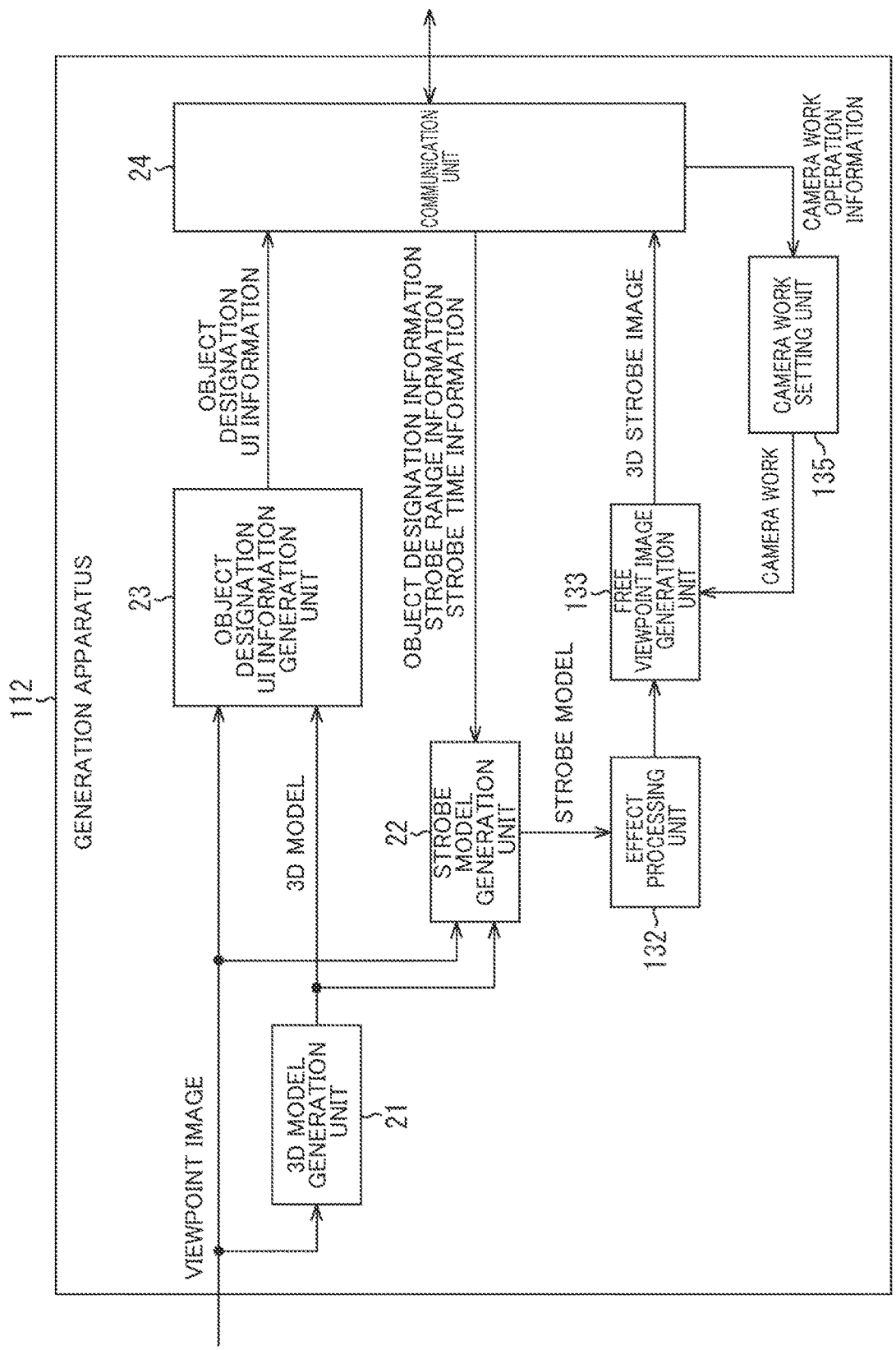
FIG. 32 is a block diagram illustrating a configuration example of a generation apparatus 112.

FIG. 32 is a block diagram illustrating a configuration example of the generation apparatus 112 in FIG. 31.

In FIG. 32, parts corresponding to those of the generation apparatus 12 in FIG. 2 are denoted by the same reference signs, and description thereof will be hereinafter appropriately omitted.

The generation apparatus 112 includes the 3D model generation unit 21, the strobe model generation unit 22, the object designation UI information generation unit 23, and the communication unit 24. Further, the generation apparatus 112 includes an effect processing unit 132, a free viewpoint image generation unit 133, and a camera work setting unit 135.

Therefore, the generation apparatus 112 is the same as the generation apparatus 12 in FIG. 2 in that the generation apparatus 112 includes the 3D model generation unit 21, the strobe model generation unit 22, the object designation UI information generation unit 23, and the communication unit 24. However, the generation apparatus 112 differs from the generation apparatus 12 in that the effect processing unit 132, the free viewpoint image generation unit 133, and the camera work setting unit 135 are newly provided.

The strobe model is supplied from the strobe model generation unit 22 to the effect processing unit 132.

The effect processing unit 132 performs effect processing on the 3D models (of the target object) disposed in the strobe model from the strobe model generation unit 22, and supplies a result of the effect processing to the free viewpoint image generation unit 133, like the effect processing unit 32 in FIG. 3. The effect processing unit 132 can perform, for example, effect processing determined in advance by the generation apparatus 113. Further, the effect processing unit 132 can perform effect processing according to the operation of the user with respect to the display apparatus 113, for example.

The free viewpoint image generation unit 133 generates, as (data of) a free viewpoint image, (a moving image of) a 3D strobe image that is a 2D image obtained by photographing the strobe model from the effect processing unit 132 with a virtual camera according to the camera work from the camera work setting unit 135, and supplies the 3D strobe image to the communication unit 24, like the free viewpoint image generation unit 133 in FIG. 3.

The camera work setting unit 135 sets the camera work of the virtual camera according to the camera work operation information supplied from the communication unit 24 and supplies the camera work of the virtual camera to the free viewpoint image generation unit 133, like the camera work setting unit 35 in FIG. 3.

The communication unit 24 in FIG. 32 transmits the 3D strobe image to the display apparatus 113 instead of the strobe model. Further, the communication unit 24 in FIG. 32 receives the camera work operation information transmitted from the display apparatus 113 and supplies the camera work operation information to the camera work setting unit 135. In this respect, the communication unit 24 in FIG. 32 differs from that in FIG. 2.

<Configuration Example of Display Apparatus 113>

Figure 33:
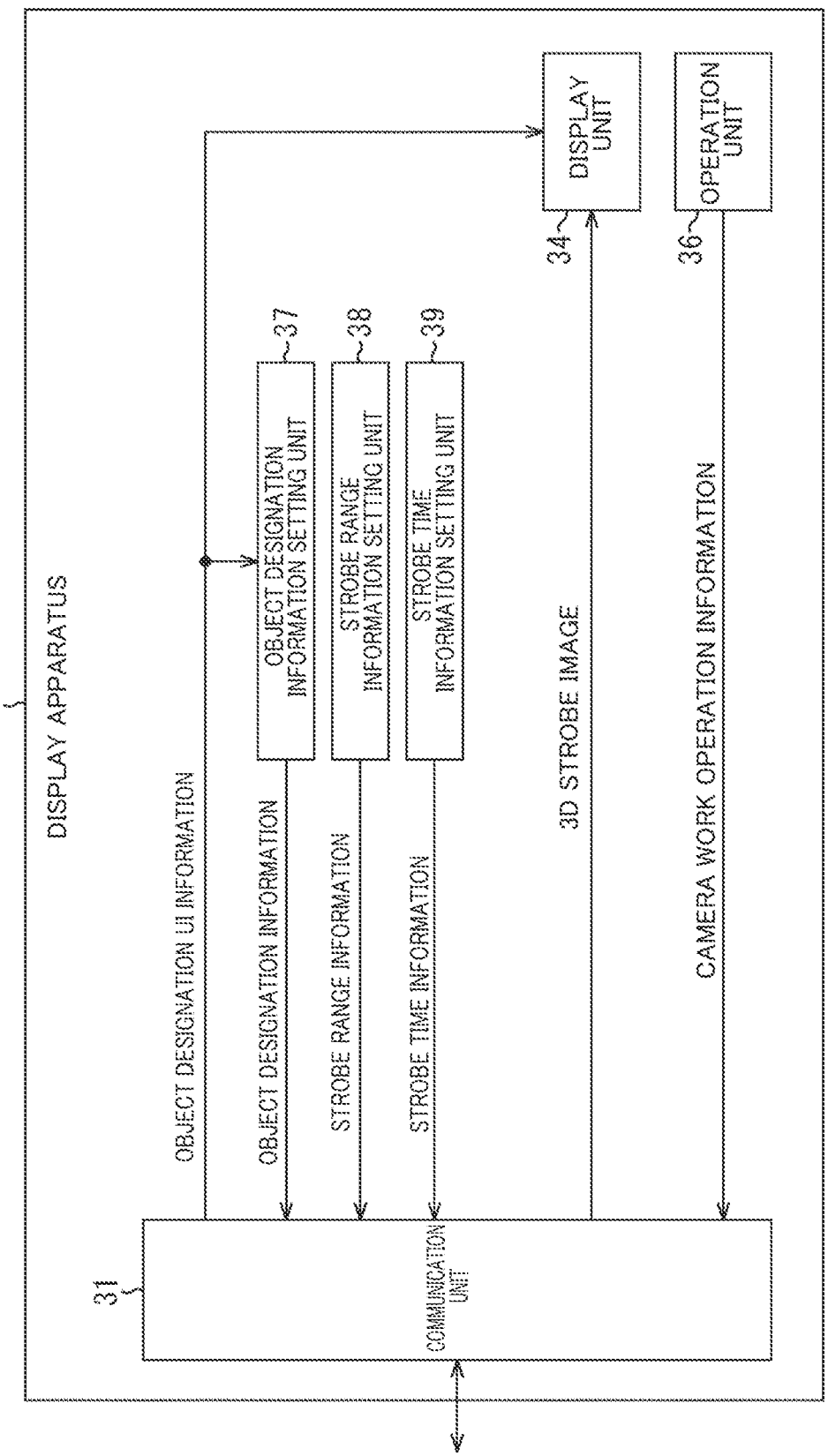
FIG. 33 is a block diagram illustrating a configuration example of a display apparatus 113.

FIG. 33 is a block diagram illustrating a configuration example of the display apparatus 113 in FIG. 31.

in FIG. 33, parts corresponding to those in FIG. 3 are denoted by the same reference signs, and description thereof will be hereinafter appropriately omitted.

The display apparatus 113 includes the communication unit 31, the display unit 34, the operation unit 36, the object designation information setting unit 37, the strobe range information setting unit 38, and the strobe time information setting unit 39.

Therefore, the display apparatus 113 is the same as the display apparatus 13 of FIG. 3 in that the display apparatus 113 includes the communication unit 31, the display unit 34, the operation unit 36, the object designation information setting unit 37, the strobe range information setting unit 38, and the strobe time information setting unit 39. However, the display apparatus 113 differs from the display apparatus 13 in that the effect processing unit 32, the free viewpoint image generation unit 33, and the camera work setting unit 35 are not provided.

In the display apparatus 113, the communication unit 31 receives the 3D strobe image transmitted from the generation apparatus 112 and supplies the 3D strobe image to the display unit 34. Further, the operation unit 36 supplies the communication unit 31 with the camera work operation information indicating an operation performed by the user with respect to the camera work according to the operation. The communication unit 31 transmits the camera work operation information from the operation unit 36 to the generation apparatus 112. In this respect, the display apparatus 113 differs from the display apparatus 13.

<Generation Processing>

Figure 34:
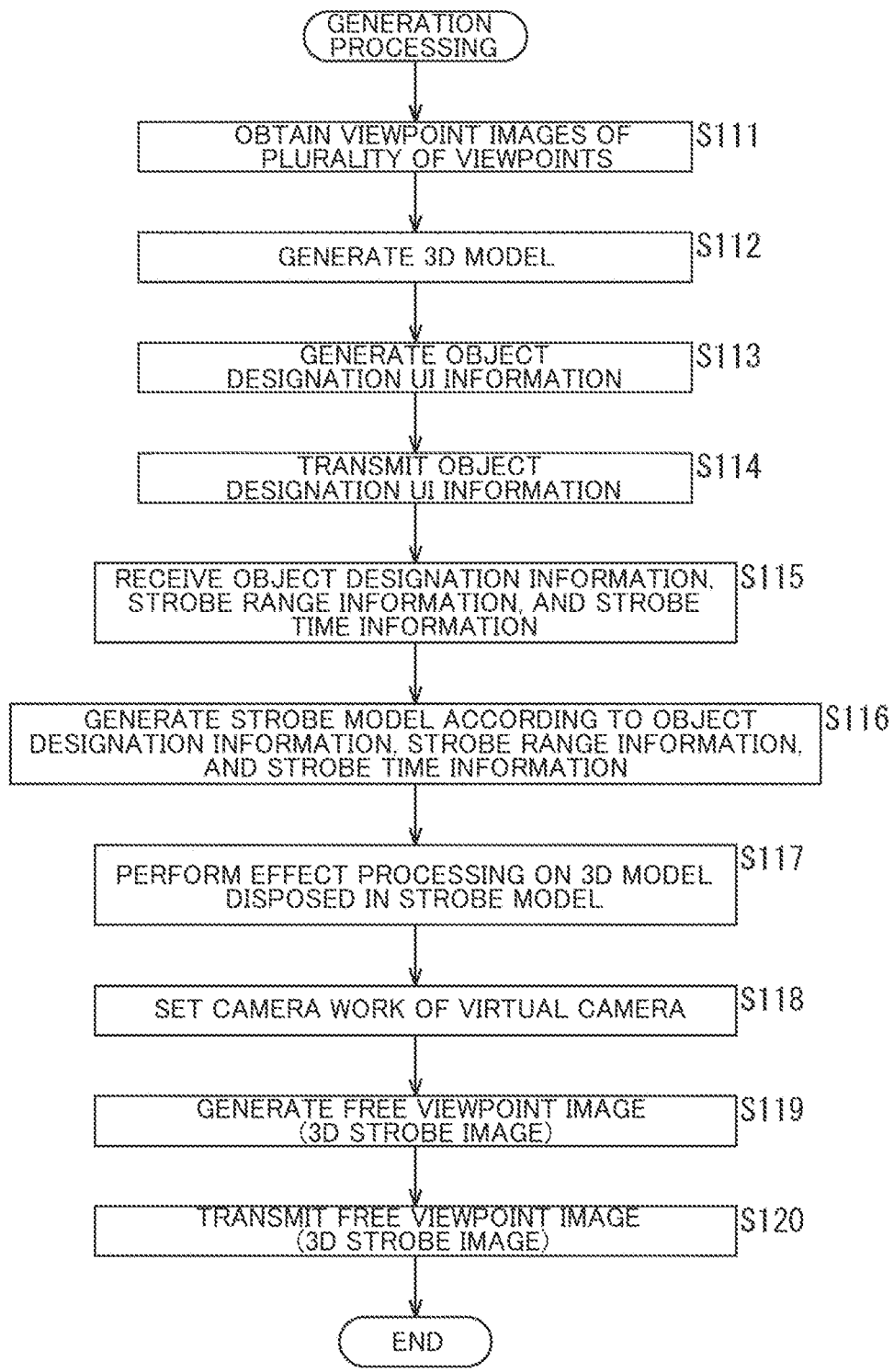
FIG. 34 is a flowchart illustrating an example of generation processing that is performed by the generation apparatus 112.

FIG. 34 is a flowchart illustrating an example of the generation processing that is performed by the generation apparatus 112 in FIG. 32.

In the generation processing, in steps S111 to S116, the same processing as in steps S11 to S16 in FIG. 4 is performed. The strobe model generated by the strobe model generation unit 22 in step S116 is supplied to the effect processing unit 132, and the processing proceeds from step S116 to step S117.

In step S117, the effect processing unit 132 performs effect processing on the 3D models (of the target object) disposed in the strobe model from the strobe model generation unit 22. The effect processing unit 132 supplies the strobe model (in which the 3D model has been disposed) after the effect processing to the free viewpoint image generation unit 133, and the processing proceeds from step S117 to step S118.

In step S118, the communication unit 24 waits for the camera work operation information to be transmitted from the display apparatus 113, receives the camera work operation information, and supplies the camera work operation information to the camera work setting unit 135. The camera work setting unit 135 sets the camera work of the virtual camera according to the camera work operation information from the communication unit 24. The camera work setting unit 135 supplies the camera work to the free viewpoint image generation unit 133, and the processing proceeds from step S118 to step S119.

In step S119, the free viewpoint image generation unit 133 generates the free viewpoint image serving as the 3D strobe image obtained by photographing the strobe model from the effect processing unit 132 with the virtual camera according to the camera work from the camera work setting unit 135 through rendering. The free viewpoint image generation unit 133 supplies the 3D strobe image to the communication unit 24, and the processing proceeds from step S119 to step S120.

In step S120, the communication unit 24 transmits the 3D strobe image from the free viewpoint image generation unit 133 to the display apparatus 113, and the generation processing ends.

<Display Processing>

Figure 35:
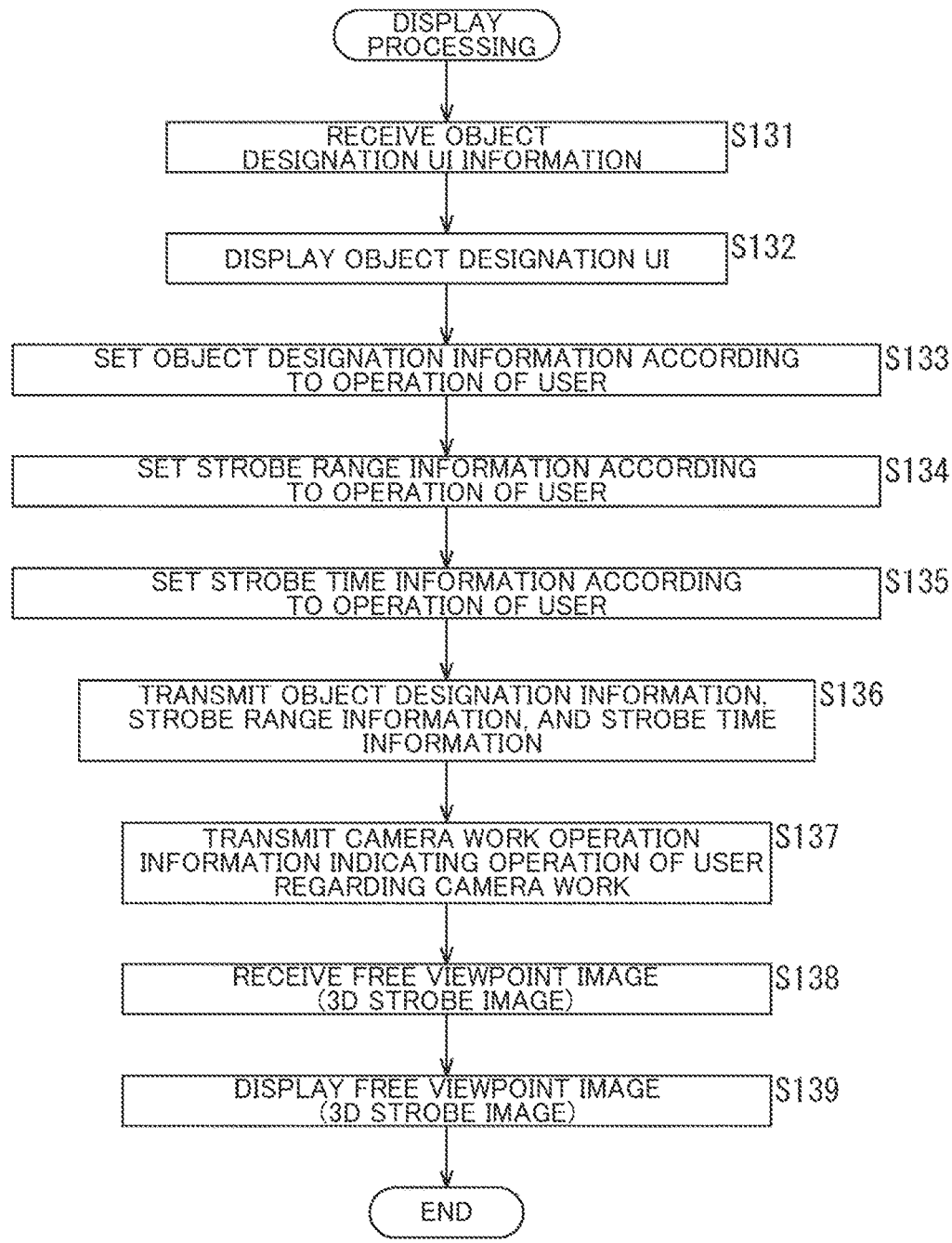
FIG. 35 is a flowchart illustrating an example of display processing that is performed by the display apparatus 113.

FIG. 35 is a flowchart illustrating an example of display processing that is performed by the display apparatus 113 in FIG. 33.

In the display processing, in steps S131 to S136, the same processing as in steps S31 to S36 in FIG. 5 is performed.

In step S137, the communication unit 31 waits for the camera work operation information to be supplied from the operation unit 36 and transmits the camera work operation information to the generation apparatus 112, and the processing proceeds to step S138.

In step S138, the communication unit 31 waits for the 3D strobe image to be transmitted from the generation apparatus 112 and receives the 3D strobe image. The communication unit 31 supplies the 3D strobe image from the generation apparatus 112 to the display unit 34, and the processing proceeds from step S138 to step S139.

In step S139, the display unit 34 displays the 3D strobe image from the communication unit 31, and the display processing ends.

In the image processing system in FIG. 31, since the effect processing, camera work setting, and 3D strobe image generation (rendering) are performed in the generation apparatus 112, a load of the display apparatus 113 can be reduced as compared with the image processing system in FIG. 1 in which the effect processing, camera work setting, and 3D strobe image generation are performed by the display apparatus 13.

<Description of Computer to which the Present Technology is Applied>

Next, a series of processing described above can be performed by hardware or can be performed software. When the series of processing is performed by software, a program constituting the software is installed on a general-purpose computer or the like.

Figure 36:
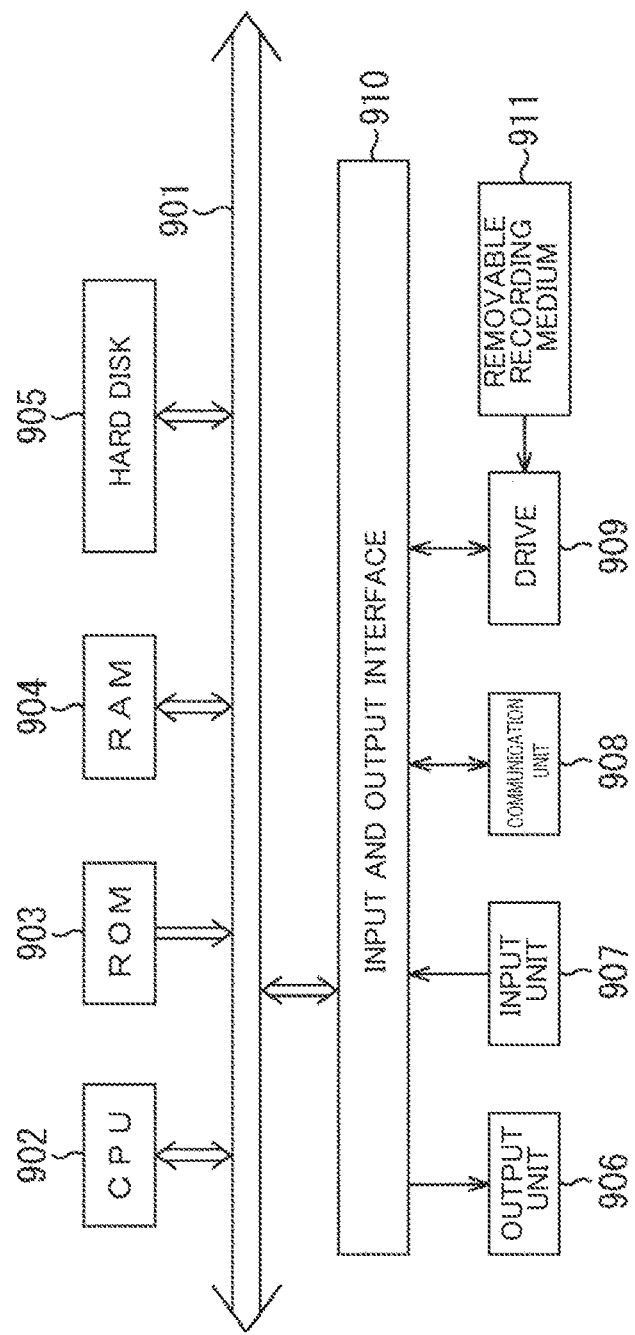
FIG. 36 is a block diagram illustrating a configuration example of an embodiment of a computer to which the present technology is applied.

FIG. 36 is a block diagram illustrating a configuration example of an embodiment of a computer in which a program for executing the series of processing described above is installed.

The program can be recorded in a hard disk 905 or a ROM 903 serving as a recording medium built into the computer in advance.

Alternatively, further, the program can be stored (recorded) in a removable recording medium 911 that is driven by a drive 909. Such removable recording medium 911 can be provided as so-called package software. Here, examples of the removable recording medium 911 include a flexible disk, a CD-ROM (Compact Disc Read Only Memory), an MO (Magneto Optical) disk, a DVD (Digital Versatile Disc), a magnetic disk, and a semiconductor memory.

Further, the program can be not only installed in the computer from the removable recording medium 911 as described above, but also downloaded to the computer via a communication network or a broadcasting network and installed in the hard disk 905 built thereinto. That is, for example, the program can be wirelessly transferred from a downloading site to the computer via a satellite for digital satellite broadcasting or can be transferred to the computer via a network such as a LAN (Local Area Network) or the Internet in a wired manner.

The computer has a CPU (Central Processing Unit) 902 built thereinto, and an input and output interface 910 is connected to the CPU 902 via a bus 901.

When an instruction is input via the input and output interface 910, for example, by the user operating an input unit 907, the CPU 902 executes the program stored in the ROM (Read Only Memory) 903 according to the instruction. Alternatively, the CPU 902 may load the program stored in the hard disk 905 to a RAM (Random Access Memory) 904 and execute the program.

Accordingly, the CPU 902 performs the processing according to the flowchart described above or the processing performed by the configuration of the block diagram described above. The CPU 902 outputs a processing result from an output unit 906 via the input and output interface 910, transmits the processing result from a communication unit 908, or records the processing result on the hard disk 905, as necessary.

Further, the input unit 907 can include a keyboard, a mouse, or a microphone. Further, the output unit 906 can include an LCD (liquid crystal display), a speaker, or the like.

Here, in the present specification, the processing that the computer performs according to a program does not have to be necessarily performed in chronological order in the order described in the flowchart. That is, the processing that the computer performs according to the program includes processing executed in parallel or individually (for example, parallel processing or object-based processing).

Further, the program may be processed by one computer (processor), or may be processed in a distributed manner by a plurality of computers. Further, the program may be transferred to and executed by a remote computer.

Further, in the present specification, the system means a set of a plurality of components (apparatuses, modules (parts), or the like), and it does not matter whether all the components are in the same housing. Therefore, a plurality of apparatuses received in individual housings and connected over a network, and one apparatus in which a plurality of modules are received in one housing are all systems.

Further, the embodiments of the present technology are not limited to the above-described embodiments, and various changes can be made without departing from the gist of the present technology.

For example, the present technology can have a cloud computing configuration to share and process one function in a plurality of apparatuses in conjunction via a network.

Further, each step described in the above-described flowchart can be executed by one apparatus or can be shared and executed by a plurality of apparatuses.

Further, when a plurality of processing is included in one step, the plurality of processing included in one step can be not only executed by one apparatus, but also can be shared and executed by a plurality of apparatuses.

Further, the effects described in the present specification are merely illustrative, and are not limited. There may be other effects.

The present technology can have the following configurations.

<1>

An image processing apparatus including:

a generation unit configured to generate 3D models of an object generated from a plurality of viewpoint images captured from a plurality of viewpoints, from the viewpoint images at a plurality of times, to generate a strobe model in which the 3D models of the object at the plurality of times are disposed in a three-dimensional space, wherein the generation unit disposes 3D models of an object different from a key object in the strobe model according to a degree of object relevance indicating a relevance between the key object and the different object, the key object serving as a reference for a disposition of the 3D models in the three-dimensional space.

<2>

The image processing apparatus according to <1>, wherein the generation unit sets a target object that is a target of the disposition of the 3D models in the strobe model according to the degree of object relevance.

<3>

The image processing apparatus according to <2>, wherein the generation unit sets the key object as the target object according to a positional relationship between the key object and a non-key object other than the key object.

<4>

The image processing apparatus according to <3>, wherein the generation unit sets the non-key object of which a distance to the key object is within a predetermined distance as the target object.

<5>

The image processing apparatus according to <4>, wherein the generation unit sets, as the target objects, the non-key object of which a distance to the key object is within the predetermined distance in one frame, and the non-key object of which a distance to the key object is within the predetermined distance in another frame.

<6>

The image processing apparatus according to <4>, wherein the generation unit sets, as the target objects, the non-key object of which a distance to the key object is within the predetermined distance and the other non-key object of which a distance to the non-key object of which the distance to the key object is within the predetermined distance is within the predetermined distance.

<7>

The image processing apparatus according to any one of <4> to <6>, wherein the predetermined distance is set for each key object or each non-key object.

<8>

The image processing apparatus according to any one of <1> to <7>, wherein the key object is set according to an operation of a user.

<9>

The image processing apparatus according to <8>, wherein an object designated by the user is set as the key object for a UI (User Interface) in which the object is reflected.

<10>

An image processing method including:

generating 3D models of an object generated from a plurality of viewpoint images captured from a plurality of viewpoints, from the viewpoint images at a plurality of times, to generate a strobe model in which the 3D models of the object at the plurality of times are disposed in a three-dimensional space, wherein 3D models of an object different from a key object are disposed in the strobe model according to a degree of object relevance indicating a relevance between the key object and the different object, the key object serving as a reference for a disposition of the 3D models in the three-dimensional space.

<11>

A program for causing a computer to function as a generation unit configured to generate 3D models of an object generated from a plurality of viewpoint images captured from a plurality of viewpoints, from the viewpoint images at a plurality of times, to generate a strobe model in which the 3D models of the object at the plurality of times are disposed in a three-dimensional space, wherein the generation unit disposes 3D models of an object different from a key object in the strobe model according to a degree of object relevance indicating a relevance between the key object and the different object, the key object serving as a reference for a disposition of the 3D models in the three-dimensional space.

<A1>

An image processing apparatus including a strobe model generation unit configured to generate a strobe model in which 3D models of a target object that is a target of disposition of the 3D models in the strobe model, which is set according to a degree of object relevance indicating a relevance with a key object serving as a reference for a disposition of the 3D models in the strobe model in which the 3D models of an object at a plurality of times generated from a plurality of viewpoint images captured from a plurality of viewpoints are disposed in a three-dimensional space.

<A2>

The image processing apparatus according to <A1>, wherein the strobe model generation unit sets a target object according to the degree of object relevance.

<A3>

The image processing apparatus according to <A2>, wherein the strobe model generation unit sets the non-key object as the target object according to a positional relationship between the key object and a non-key object other than the key object.

<A4>

The image processing apparatus according to <A3>, wherein the strobe model generation unit sets the non-key object of which a distance to the key object is within a predetermined distance as the target object.

<A5>

The image processing apparatus according to <A4>, wherein the strobe model generation unit sets, as the target objects, the non-key object of which a distance to the key object is within the predetermined distance in one frame, and the non-key object of which a distance to the key object is within the predetermined distance in another frame.

<A6>

The image processing apparatus according to <A4>, wherein the strobe model generation unit sets, as the target objects, the non-key object of which a distance to the key object is within the predetermined distance and the other non-key object of which a distance to the non-key object of which the distance to the key object is within the predetermined distance is within the predetermined distance.

`<A7>`

The image processing apparatus according to any one of `<A4>` to `<A6>`, wherein the predetermined distance is set for each key object or each non-key object.

`<A8>`

The image processing apparatus according to any one of `<A1>` to `<A7>`, wherein the key object is set according to an operation of a user.

`<A9>`

The image processing apparatus according to `<A8>`, wherein an object designated by the user is set as the key object for a UI (user interface) in which the object is reflected.

`<A10>`

An image processing method including generating a strobe model in which 3D models of a target object that is a target of disposition of the 3D models in the strobe model, which is set according to a degree of object relevance indicating a relevance with a key object serving as a reference for a disposition of the 3D models in the strobe model in which the 3D models of an object at a plurality of times generated from a plurality of viewpoint images captured from a plurality of viewpoints are disposed in a three-dimensional space.

`<A11>`

A program for causing a computer to function as a strobe model generation unit configured to generate a strobe model in which 3D models of a target object that is a target of disposition of the 3D models in the strobe model, which is set according to a degree of object relevance indicating a relevance with a key object serving as a reference for a disposition of the 3D models in the strobe model in which the 3D models of an object at a plurality of times generated from a plurality of viewpoint images captured from a plurality of viewpoints are disposed in a three-dimensional space.

REFERENCE SIGNS LIST

11 Photographing apparatus
12 Generation apparatus
13 Display apparatus
21 3D model generation unit
22 Strobe model generation unit
23 Object designation UI information generation unit
24, 31 Communication unit
32 Effect processing unit
33 Free viewpoint image generation unit
34 Display unit
35 Camera work setting unit
36 Operation unit
37 Object designation information setting unit
38 Strobe range information setting unit
39 Strobe time information setting unit
112 Generation apparatus
113 Display apparatus
132 Effect processing unit
133 Free viewpoint image generation unit
135 Camera work setting unit
901 Bus
902 CPU
903 ROM
904 RAM
905 Hard disk
906 Output unit
907 Input unit
908 Communication unit
909 Drive
910 Input and output interface
911 Removable recording medium

The invention claimed is:

1. An image processing apparatus, comprising:
a central processing unit (CPU) configured to:
receive a plurality of viewpoint images captured at a plurality of times from a plurality of viewpoints, wherein each viewpoint image of the plurality of viewpoint images includes a first non-key object and a second non-key object;
generate three-dimensional (3D) models of the first non-key object and the second non-key object based on the plurality of viewpoint images;
set the first non-key object and the second non-key object as a plurality of target objects based on
a distance between a key object and the first non-key object that is within a specific distance, and
a distance between the first non-key object and the second non-key object that is within the specific distance, wherein
the first non-key object and the second non-key object are different from the key object; and
generate, as 3D data, a strobe model in which the 3D models of the plurality of target objects are disposed in a 3D space, wherein the key object serves as a reference for the disposition of the 3D models in the 3D space.

2. The image processing apparatus according to claim 1, wherein
each viewpoint image of the plurality of viewpoint images further includes a third non-key object different from the key object, and
the CPU is further configured to set the first non-key object and the third non-key object as the plurality of target objects based on
the distance between the key object and the first non-key object that is within the specific distance in a first frame, and
a distance between the key object and the third non-key object that is within the specific distance in a second frame.

3. The image processing apparatus according to claim 1, wherein the specific distance is set for at least one of the key object or the first non-key object.

4. The image processing apparatus according to claim 1, wherein the key object is set based on a user operation.

5. The image processing apparatus according to claim 4, wherein the key object is set based on the user operation on a UI (User Interface) in which the key object is reflected.

6. An image processing method, comprising:
receiving a plurality of viewpoint images captured at a plurality of times from a plurality of viewpoints, wherein each viewpoint image of the plurality of viewpoint images includes a first non-key object and a second non-key object;
generating three-dimensional (3D) models of the first non-key object and the second non-key object based on the plurality of viewpoint images;
setting the first non-key object and the second non-key object as a plurality of target objects based on
a distance between a key object and the first non-key object that is within a specific distance, and
a distance between the first non-key object and the second non-key object that is within the specific distance, wherein the first non-key object and the second non-key object are different from the key object; and generating, as 3D data, a strobe model in which the 3D models of the plurality of target objects are disposed in a 3D space, wherein the key object serves as a reference for the disposition of the 3D models in the 3D space.

7. A non-transitory computer-readable medium having stored thereon, computer-executable instructions which, when executed by a computer, cause the computer to execute operations, the operations comprising:

receiving a plurality of viewpoint images captured at a plurality of times from a plurality of viewpoints, wherein each viewpoint image of the plurality of viewpoint images includes a first non-key object and a second non-key object;

generating three-dimensional (3D) models of the first non-key object and the second non-key object based on the plurality of viewpoint images;

setting the first non-key object and the second non-key object as a plurality of target objects based on
- a distance between a key object and the first non-key object that is within a specific distance, and
- a distance between the first non-key object and the second non-key object that is within the specific distance, wherein
  the first non-key object and the second non-key object are different from the key object; and generating, as 3D data, a strobe model in which the 3D models of the plurality of target objects are disposed in a 3D space, wherein the key object serves as a reference for the disposition of the 3D models in the 3D space.

* * * * *